US011038974B1

(12) United States Patent
Koukoumidis et al.

(10) Patent No.: US 11,038,974 B1
(45) Date of Patent: Jun. 15, 2021

(54) RECOMMENDING CONTENT WITH ASSISTANT SYSTEMS

(71) Applicant: Facebook, Inc., Menlo Park, CA (US)

(72) Inventors: Emmanouil Koukoumidis, Kirkland, WA (US); Fuchun Peng, Cupertino, CA (US); Jason Schissel, Mill Creek, WA (US)

(73) Assignee: Facebook, Inc., Menlo Park, CA (US)

( * ) Notice: Subject to any disclaimer, the term of this patent is extended or adjusted under 35 U.S.C. 154(b) by 65 days.

(21) Appl. No.: 16/036,827

(22) Filed: Jul. 16, 2018

Related U.S. Application Data

(60) Provisional application No. 62/660,876, filed on Apr. 20, 2018.

(51) Int. Cl.
*G06F 15/173* (2006.01)
*H04L 29/08* (2006.01)
*G06Q 50/00* (2012.01)

(52) U.S. Cl.
CPC ............ *H04L 67/22* (2013.01); *G06Q 50/01* (2013.01); *H04L 67/306* (2013.01)

(58) Field of Classification Search
CPC ........ H04L 67/22; H04L 67/306; G06Q 50/01
USPC ........................................ 709/203, 223, 224
See application file for complete search history.

(56) References Cited

U.S. PATENT DOCUMENTS

| | | | |
|---|---|---|---|
| 7,124,123 B1 | 10/2006 | Roskind | |
| 7,158,678 B2 | 1/2007 | Nagel | |
| 7,397,912 B2 | 7/2008 | Aasman | |
| 8,027,451 B2 | 9/2011 | Arendsen | |
| 8,560,564 B1 | 10/2013 | Hoelzle | |
| 8,677,377 B2 | 3/2014 | Cheyer | |
| 8,935,192 B1 | 1/2015 | Ventilla | |
| 8,983,383 B1 | 3/2015 | Haskin | |

(Continued)

FOREIGN PATENT DOCUMENTS

| | | |
|---|---|---|
| AU | 2017203668 | 1/2018 |
| EP | 2530870 | 12/2012 |

(Continued)

OTHER PUBLICATIONS

U.S. Appl. No. 14/593,723, filed Jan. 9, 2015, Colin Patrick Treseler.

(Continued)

*Primary Examiner* — Thu Ha T Nguyen
(74) *Attorney, Agent, or Firm* — Baker Botts L.L.P.

(57) ABSTRACT

In one embodiment, a method includes, by one or more computing devices, receiving, from a client system associated with a first user of an online social network, an indication of a trigger action by the first user, wherein the trigger action is associated with a user activity, determining a first user context based on the trigger action, accessing one or more recommended content objects associated with the first user context, calculating a recommendation score for each recommended content object, generating one or more content suggestions comprising one of the one or more recommended content objects, respectively, each content suggestion corresponding to a recommended content object having a recommendation score above a threshold recommendation score, and sending, to the client system in response to the trigger action, instructions for presenting one or more of the content suggestions to the first user.

18 Claims, 15 Drawing Sheets

(56) References Cited

U.S. PATENT DOCUMENTS

| | | | |
|---|---|---|---|
| 9,154,739 B1 | 10/2015 | Nicolaou | |
| 9,177,291 B2* | 11/2015 | Martinazzi | G06Q 30/0201 |
| 9,299,059 B1* | 3/2016 | Marra | G06F 16/951 |
| 9,304,736 B1 | 4/2016 | Whiteley | |
| 9,338,242 B1 | 5/2016 | Suchland | |
| 9,338,493 B2 | 5/2016 | Van Os | |
| 9,390,724 B2 | 7/2016 | List | |
| 9,418,658 B1 | 8/2016 | David | |
| 9,472,206 B2 | 10/2016 | Ady | |
| 9,479,931 B2 | 10/2016 | Ortiz | |
| 9,576,574 B2 | 2/2017 | van Os | |
| 9,659,577 B1 | 5/2017 | Langhammer | |
| 9,660,950 B2* | 5/2017 | Archibong | H04N 21/26258 |
| 9,686,577 B2* | 6/2017 | Tseng | G06F 3/04886 |
| 9,747,895 B1 | 8/2017 | Jansche | |
| 9,792,281 B2 | 10/2017 | Sarikaya | |
| 9,858,925 B2 | 1/2018 | Gruber | |
| 9,865,260 B1 | 1/2018 | Vuskovic | |
| 9,875,233 B1 | 1/2018 | Tomkins | |
| 9,875,741 B2 | 1/2018 | Gelfenbeyn | |
| 9,886,953 B2 | 2/2018 | Lemay | |
| 9,990,591 B2 | 6/2018 | Gelfenbeyn | |
| 10,042,032 B2 | 8/2018 | Scott | |
| 10,134,395 B2 | 11/2018 | Typrin | |
| 10,199,051 B2 | 2/2019 | Binder | |
| 10,241,752 B2 | 3/2019 | Lemay | |
| 10,276,170 B2 | 4/2019 | Gruber | |
| 10,467,282 B2* | 11/2019 | Shorman | H04L 67/306 |
| 2008/0240379 A1 | 10/2008 | Maislos | |
| 2012/0246191 A1 | 9/2012 | Xiong | |
| 2012/0265528 A1 | 10/2012 | Gruber | |
| 2013/0073387 A1* | 3/2013 | Heath | G06Q 30/02 705/14.53 |
| 2013/0073389 A1* | 3/2013 | Heath | G06Q 50/01 705/14.54 |
| 2013/0073400 A1* | 3/2013 | Heath | G06F 16/29 705/14.73 |
| 2013/0073473 A1* | 3/2013 | Heath | G06Q 30/06 705/319 |
| 2013/0268839 A1 | 10/2013 | Lefebvre | |
| 2013/0275138 A1 | 10/2013 | Gruber | |
| 2013/0275164 A1* | 10/2013 | Gruber | G10L 17/22 705/5 |
| 2014/0074934 A1* | 3/2014 | van Hoff | G06F 16/2237 709/204 |
| 2014/0164506 A1* | 6/2014 | Tesch | H04L 51/32 709/204 |
| 2014/0195371 A1* | 7/2014 | Kageyama | G06Q 30/0631 705/26.7 |
| 2015/0169744 A1* | 6/2015 | Walkingshaw | G06Q 30/0251 707/738 |
| 2015/0179168 A1 | 6/2015 | Hakkani-Tur | |
| 2015/0242525 A1* | 8/2015 | Perlegos | G06F 16/972 707/782 |
| 2015/0256636 A1* | 9/2015 | Spivack | G06Q 10/10 715/736 |
| 2015/0339303 A1* | 11/2015 | Perlegos | G06F 16/7867 707/756 |
| 2016/0042249 A1* | 2/2016 | Babenko | G06K 9/00744 382/170 |
| 2016/0203238 A1* | 7/2016 | Cherniavskii | G06F 16/24575 707/722 |
| 2016/0225370 A1 | 8/2016 | Kannan | |
| 2016/0255082 A1 | 9/2016 | Rathod | |
| 2016/0328096 A1 | 11/2016 | Tran | |
| 2016/0378849 A1 | 12/2016 | Myslinski | |
| 2016/0378861 A1 | 12/2016 | Eledath | |
| 2017/0034112 A1* | 2/2017 | Perlegos | H04L 67/22 |
| 2017/0091168 A1 | 3/2017 | Bellegarda | |
| 2017/0132019 A1 | 5/2017 | Karashchuk | |
| 2017/0132688 A1* | 5/2017 | Freund | G06Q 50/01 |
| 2017/0147696 A1* | 5/2017 | Evnine | G06F 16/9535 |
| 2017/0188101 A1* | 6/2017 | Srinivasaraghavan | H04L 67/10 |
| 2017/0353469 A1 | 12/2017 | Selekman | |
| 2017/0359707 A1 | 12/2017 | Diaconu | |
| 2018/0018562 A1 | 1/2018 | Jung | |
| 2018/0018987 A1 | 1/2018 | Zass | |
| 2018/0096071 A1* | 4/2018 | Green | G06Q 10/10 |
| 2018/0096072 A1 | 4/2018 | He | |
| 2018/0107917 A1* | 4/2018 | Hewavitharana | G06N 5/022 |
| 2018/0157981 A1* | 6/2018 | Albertson | G06N 3/006 |
| 2018/0189629 A1 | 7/2018 | Yatziv | |
| 2018/0350144 A1* | 12/2018 | Rathod | G06Q 20/3276 |
| 2019/0080698 A1 | 3/2019 | Miller | |
| 2019/0266185 A1* | 8/2019 | Rao | H04N 21/4661 |
| 2019/0332946 A1* | 10/2019 | Han | G06F 16/24578 |
| 2020/0045119 A1* | 2/2020 | Weldemariam | G06Q 20/22 |

FOREIGN PATENT DOCUMENTS

| | | |
|---|---|---|
| EP | 3122001 | 1/2017 |
| WO | WO 2012/116241 | 8/2012 |
| WO | WO 2016/195739 | 12/2016 |
| WO | WO 2017/053208 | 3/2017 |
| WO | WO 2017/116488 | 7/2017 |

OTHER PUBLICATIONS

U.S. Appl. No. 15/808,638, filed Nov. 9, 2017, Ryan Brownhill.
U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 26, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.

(56) References Cited

OTHER PUBLICATIONS

U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 62/660,876, filed Apr. 20, 2018, Anuj Kumar.
U.S. Appl. No. 62/660,879, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
Mari Ostendorf, et al.: Human Language Technology: Opportunities and Challenges, IEEE International Conference on Acoustics, Speech, and Signal Processing, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, Apr. 3-7, 2017.
Chris Dyer, et al.: Recurrent Neural Network Grammars, Proceedings of NAACL-HLT 2016, pp. 199-209, San Diego, California, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-embedding-with-word2vec-and-fasttext-a209c1d3e12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv:1812.00116, Dec. 1, 2018.
Turniški, Filip, et al. "Analysis of 3G and 4G download throughput in pedestrian zones." 2016 International Symposium ELMAR. IEEE, Sep. 12, 2016.
Dubin, Ran, et al. "Adaptation Logic for HTTP Dynamic Adaptive Streaming using Geo-Predictive Crowdsourcing." arXiv preprint arXiv:1602.02030, Feb. 5, 2016.
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.6-1222, dated Feb. 5, 2019.
European search report received from the European Patent Office for European Patent Application No. 19155094.6-1218, dated Mar. 19, 2019.

\* cited by examiner

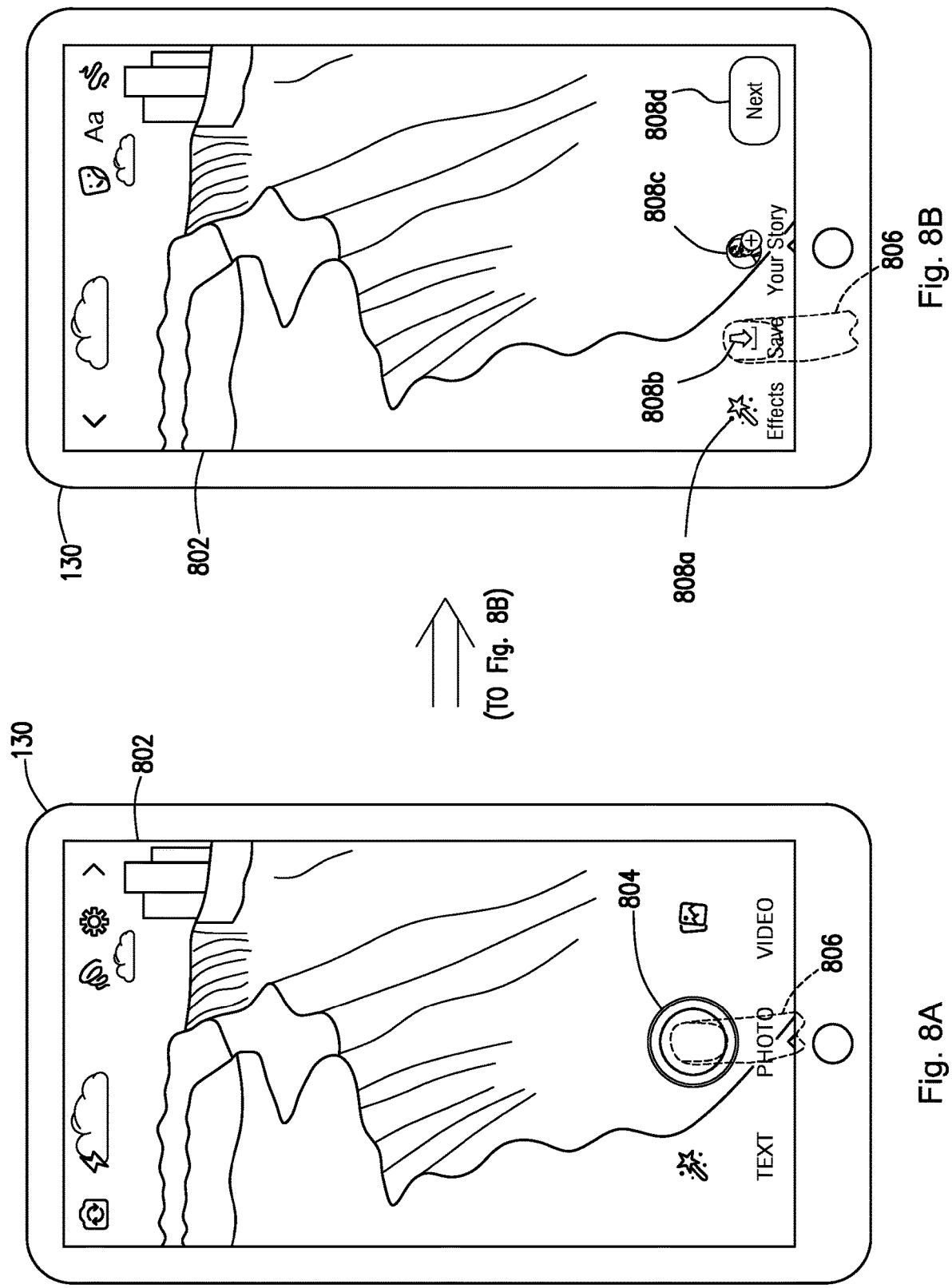

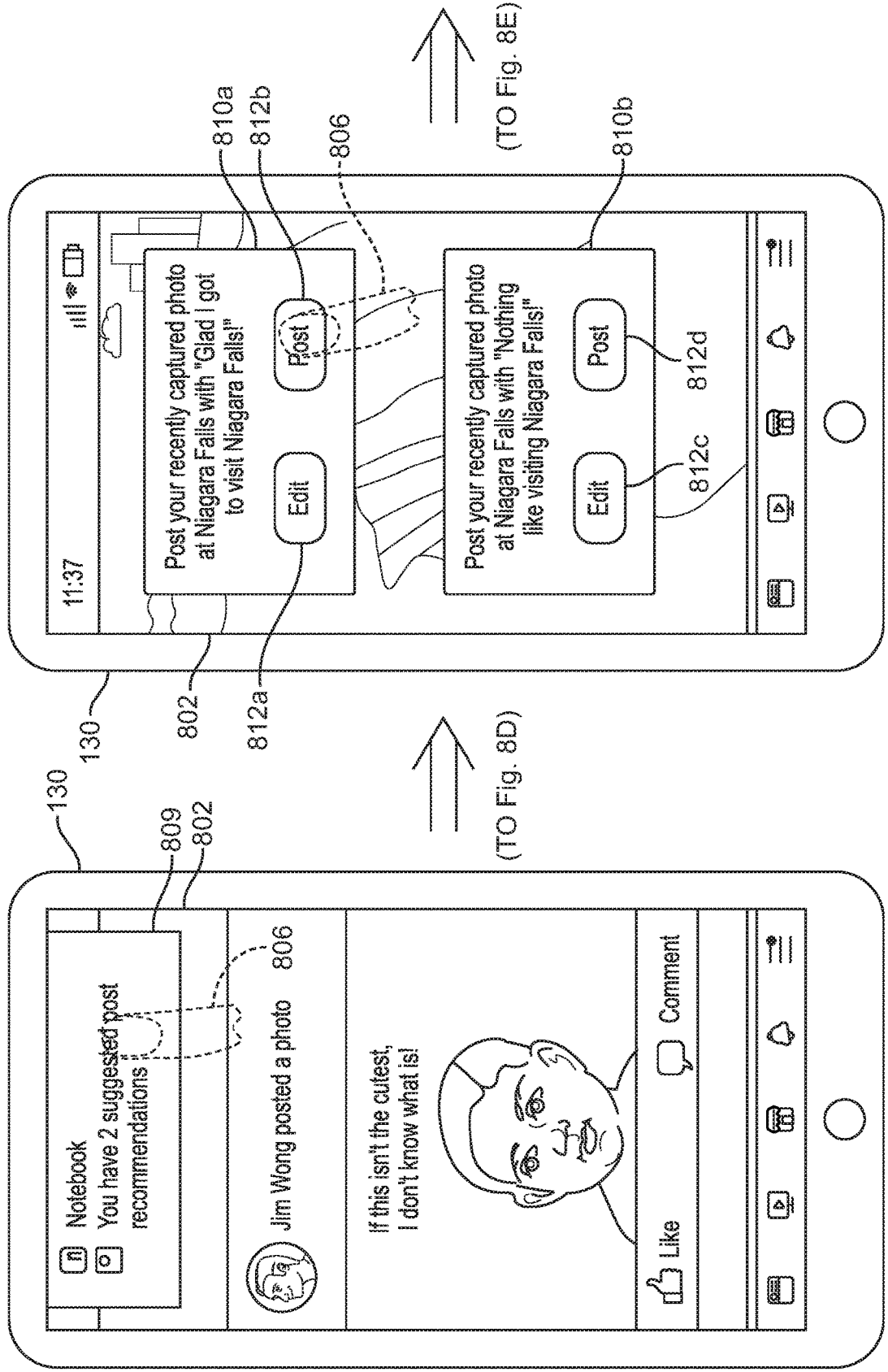

US 11,038,974 B1

RECOMMENDING CONTENT WITH ASSISTANT SYSTEMS

PRIORITY

This application claims the benefit, under 35 U.S.C. § 119(e), of U.S. Provisional Patent Application No. 62/660,876, filed 20 Apr. 2018, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiment, the assistant system may provide content suggestions for a user in response to receiving an indication of a trigger action by the user. Many users of an online social network may capture moments (e.g., through photos, videos, notes) throughout the day that may be appreciated by other users of the online social network. Additionally, users may interact with content or may read interesting articles that other users may want to know about, such as breakthroughs in science and technology, investment tips, latest entertainment news and the like. However, these users may not know that other users may want to learn about these captured moments or content. The reasons behind this may vary from that the users are more reclusive, they may be unaware that other users may be interested in the captured moments, or they do not know how the post would be received (e.g., if a lot of people will like or comment on the generated content). As such, an assistant system may help identify captured moments and content a user may want to share with his or her friends on an online social network. This may increase the volume and quality of the social interactions between a user and his or her friends on the online social network. To help recommend the user to create posts or send messages, the assistant system may first generate a database of high quality posts by identifying the posts that have strong social signals (e.g., likes, comments, shares, views etc.) that at least meets a threshold level of social signals (e.g., 50 likes and comments). The assistant system may then identify the contexts of these different posts. A user context is a representation of a particular user state of a user, and may be defined by various parameters. For example, the user state may refer to the user's activity (e.g., user is scrolling through his newsfeed or user is currently running) and/or a description of the user's status (e.g., user is on vacation or user is 100 miles away from home). The context may include date/time, location, and other metadata and content of posts. For example, a popular context that receives a high number of social interactions may be a photo in front of Niagara Falls during the day. The assistant system may generate a database of a collection of these popular contexts that garner the threshold amount of social interactions (e.g., likes, comments, views shares) with other users of the online social network. From the database, the assistant system may identify whenever a user captures a moment that matches a popular context. As an example and not by way of limitation, the assistant system may determine that the user recently captured a photo at Niagara Falls in a similar position as many people who have posted about the Niagara Falls and received a lot of social interaction from the post. The assistant system may subsequently recommend the user to post his or her photo to share the photo with other users of the online social network (e.g., recommending the user post the photo with the text "Enjoying my time at Niagara Falls today!" and tagging Niagara Falls in the post) or send a message containing the photo (e.g., recommending the user send the photo to a group chat with his family). The assistant system may monitor the social interactions with the post and determine whether it has received a threshold amount of social interactions. This may provide insight on whether the recommendation was a good recommendation (e.g., a high-quality post that has generated a threshold amount of social interactions) for the particular user. A user recommendation profile may be updated for that particular user based on the social interactions of the post, thus allowing more personalized recommendations for the user in the future. The assistant system may also determine whether the user is close to replicating a popular context as compared to the index of popular contexts and recommend the user to perform an action (e.g., capture a photo) to generate content (e.g., create a post) to share with his or her friends on the online social network. As an example and not by way of limitation, the user may be close to a place while at Niagara Falls that has been identified as a location that other users have captured photos and received a threshold amount of social interaction after posting on the online social network. Responsive to detecting that the user's current context closely matches this context related to Niagara Falls, the assistant system may recommend the user to capture a photo or generate a post about the experience. Once the user begins to share the captured moment or content, the assistant system 140 may prime text for the specific context. As an example and not by way of limitation, after a user begins composing a post, the assistant system may recommend that the user include "Enjoying my time at Niagara Falls today!" as text accompanying the post. Although this disclosure describes providing content suggestions for a user in response to receiving particular trigger actions in a particular manner, this disclosure contemplates providing content suggestions for a user in response to receiving any suitable trigger action in any suitable manner.

In particular embodiments, the assistant system may receive an indication of a trigger action by the user from the client system associated with the user. The trigger action may be associated with a user activity. In particular embodiments, the assistant system may determine a user context based on the trigger action. The assistant system may access one or more recommended content objects associated with the user context. After accessing the recommended content objects, the assistant system may calculate a recommendation score for each recommended content object. In particular embodiments, the assistant system may generate one or more content suggestions comprising the one or more recommended content objects. Each content suggestion may correspond to a recommended content object having a recommendation score above a threshold recommendation score. The assistant system may send instructions for presenting the one or more content suggestions to the client system of the user in response to the trigger action.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 8A-8E illustrate an example process of receiving content suggestions on the client system of the user.

DESCRIPTION OF EXAMPLE EMBODIMENTS

System Overview

Figure 1:
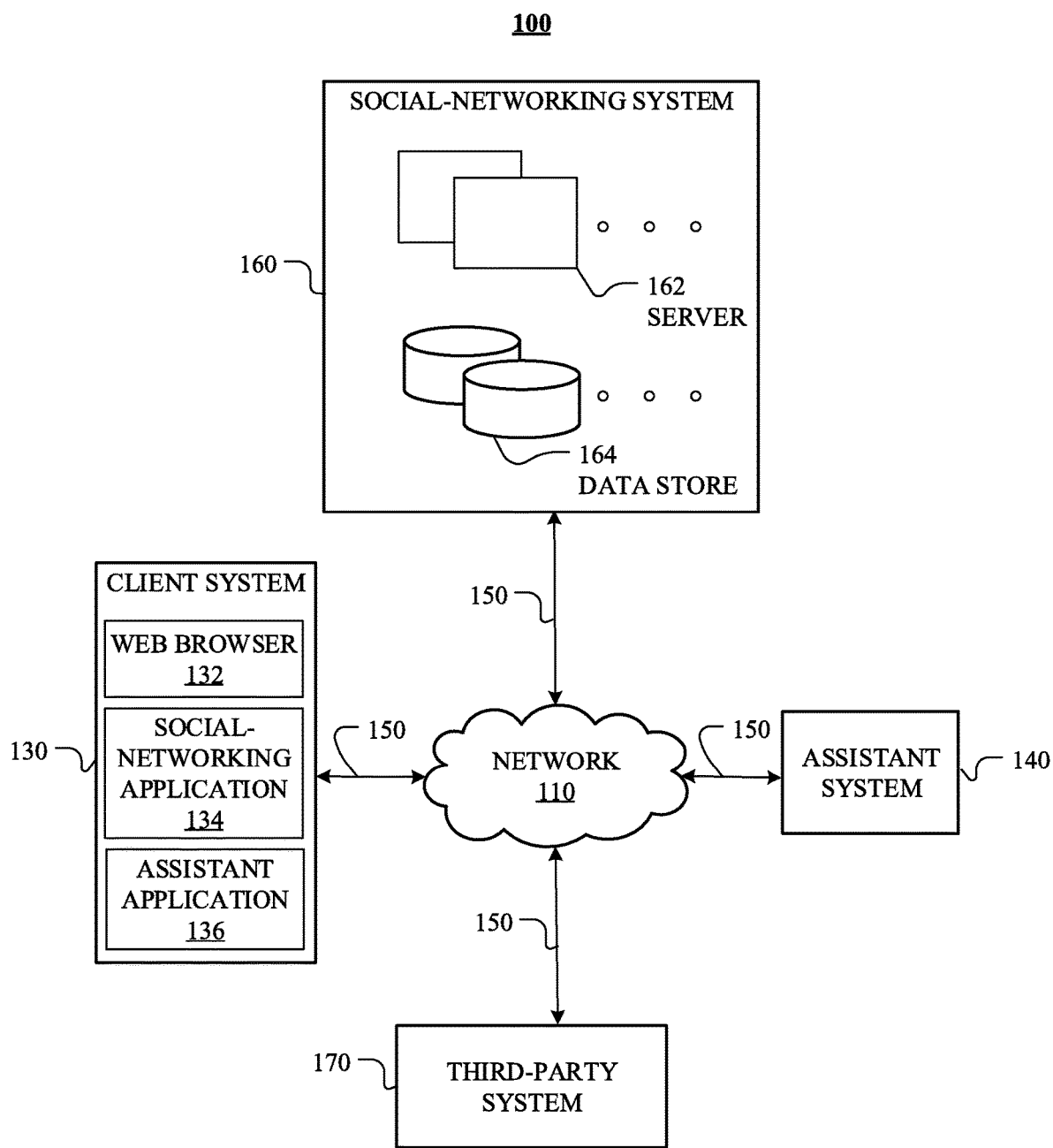
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. patent application Ser. No. 29/631,910, filed 3 Jan. 2018, U.S. patent application Ser. No. 29/631,747, filed 2 Jan. 2018, U.S. patent application Ser. No. 29/631,913, filed 3 Jan. 2018, and U.S. patent application Ser. No. 29/631,914, filed 3 Jan. 2018, which are incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
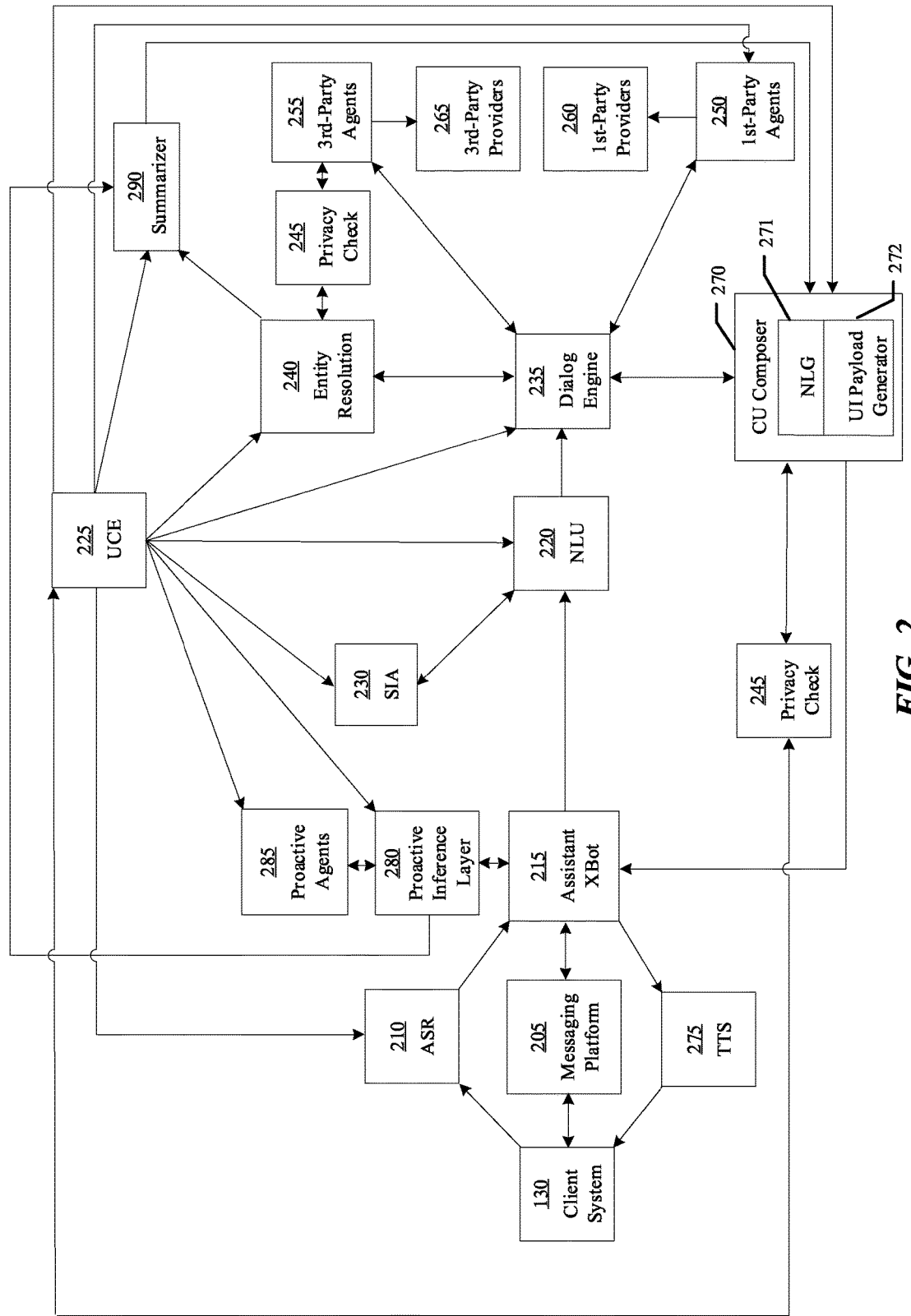
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings.

In particular embodiments, the assistant system 140 may receive a user input from the assistant application 136 in the client system 130 associated with the user. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. The semantic information aggregator 230 may provide ontology data associated with a plurality of predefined domains, intents, and slots to the NLU module 220. In particular embodiments, a domain may denote a social context of interaction, e.g., education. An intent may indicate a purpose of a user interacting with the assistant system 140. A slot may represent a basic semantic entity. For example, a slot for "pizza" may be dish. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the movies". The NLU module 220 may identify the particular movie theatre that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., online social network, online encyclopedia, movie review sources, media databases, and entertainment content sources), and then deduped, resolved, and fused to generate the single unique record for the knowledge graph. The entity may be associated with a space attribute value which indicates the genre of the movie "The Martian" (2015). The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score.

In particular embodiments, the dialog engine 235 may communicate with different agents based on the identified intent and domain, and the resolved entities. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented.

When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275.

Figure 3:
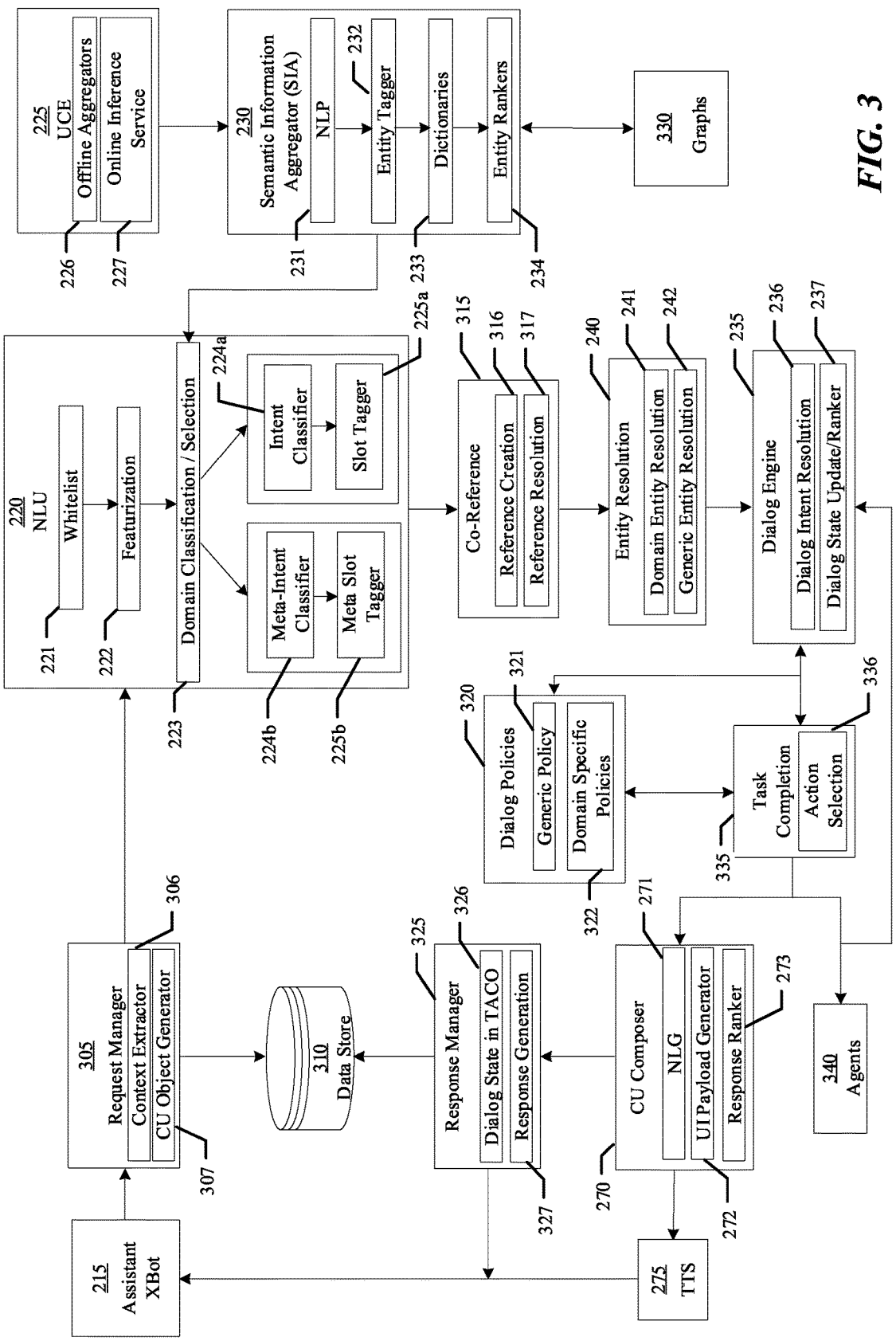
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The CU object generator 307 may generate particular content objects relevant to the user request. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. At step 222, the NLU module 220 may perform a featurization based on the whitelist. At step 223, the NLU module 220 may perform domain classification/selection based on the features resulted from the featurization. The domain classification/selection results may be further processed based on two related procedures. At step 224a, the NLU module 220 may process the domain classification/selection result using an intent classifier. The intent classifier may determine the user's intent associated with the user request. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. At step 225b, the NLU module 220 may use a meta slot tagger to annotate one or more slots for the classification result from the meta-intent classifier. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). At step 232, the processing result may be annotated with entities by an entity tagger. Based on the annotations, the semantic information aggregator 230 may generate dictionaries for the retrieved information at step 233. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest gas station and direct me there". The co-reference module 315 may interpret "there" as "the nearest gas station". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a brand of electric car, the generic entity resolution 242 may resolve the brand of electric car as vehicle and the domain entity resolution 241 may resolve the brand of electric car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session. In particular embodiments, the dialog state update/ranker 237 may update/rank the state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. The task completion module 335 may comprise an action selection component 336. In particular embodiments, the dialog engine 235 may additionally check against dialog policies 320 regarding the dialog state. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Recommending Content with Assistant Systems

In particular embodiments, the assistant system 140 may provide content suggestions for a user in response to receiving an indication of a trigger action by the user. Many users of an online social network may capture moments (e.g., through photos, videos, notes) throughout the day that may be appreciated by other users of the online social network. Additionally, users may interact with content or may read interesting articles that other users may want to know about, such as breakthroughs in science and technology, investment tips, latest entertainment news and the like. However, these users may not know that other users may want to learn about these captured moments or content. The reasons behind this may vary from that the users are more reclusive, they may be unaware that other users may be interested in the captured moments, or they do not know how the post would be received (e.g., if a lot of people will like or comment on the generated content). As such, an assistant system 140 may help identify captured moments and content a user may want to share with his or her friends on an online social network. This would increase the volume and quality of the social interactions between a user and his or her friends on the online social network. To help recommend the user to create posts or send messages, the assistant system 140 may first generate a database of high quality posts by identifying the posts that have strong social signals (e.g., likes, comments, shares, views etc.) that at least meets a threshold level of social signals (e.g., 50 likes and comments). The assistant system 140 may then identify the contexts of these different posts. A user context is representative of a particular user state of a user, and may be defined by various parameters. For example, the user state may refer to the user's activity (e.g., user is scrolling through his newsfeed or user is currently running) and/or a description of the user's status (e.g., user is on vacation or user is 100 miles away from home). The context may include date/time, location, and other metadata and content of posts. For example, a popular context that receives a high number of social interactions may be a photo in front of Niagara Falls during the day. The assistant system 140 may generate a database of a collection of these popular contexts that garner the threshold amount of social interactions (e.g., likes, comments, views shares) with other users of the online social network. From the database, the assistant system 140 may identify whenever a user captures a moment that matches a popular context. As an example and not by way of limitation, the assistant system 140 may determine that the user recently captured a photo at Niagara Falls in a similar position as many people who have posted about the Niagara Falls and received a lot of social interaction from the post. The assistant system 140 may subsequently recommend the user to post his or her photo to share the photo with other users of the online social network (e.g., recommending the user post the photo with the text "Enjoying my time at Niagara Falls today!" and tagging Niagara Falls in the post) or send a message containing the photo (e.g., recommending the user send the photo to a group chat with his family). The assistant system 140 may monitor the social interactions with the post and determine whether it has received a threshold amount of social interactions. This may provide insight on whether the recommendation was a good recommendation (e.g., a post that has generated a threshold amount of social interactions) for the particular user. A user recommendation profile may be updated for that particular user based on the social interactions of the post, thus allowing more personalized recommendations for the user in the future. The assistant system 140 may also determine whether the user is close to replicating a popular context as compared to the index of popular contexts and recommend the user to perform an action (e.g., capture a photo) to generate content (e.g., create a post) to share with his or her friends on the online social network. As an example and not by way of limitation, the user may be close to a place while at Niagara Falls that has been identified as a location that other users have captured photos and received a threshold amount of social interaction after posting on the online social network. Responsive to detecting that the user's current context closely matches this context related to Niagara Falls, the assistant system may recommend the user to capture a photo or generate a post about the experience. Once the user begins to share the captured moment or content, the assistant system 140 may prime text for the specific context. As an example and not by way of limitation, after a user generates a post, the assistant system 140 may recommend to include "Enjoying my time at Niagara Falls today!" as text accompanying the post. Although this disclosure describes providing content suggestions for a user in response to receiving particular trigger actions in a particular manner, this disclosure contemplates providing content suggestions for a user in response to receiving any suitable trigger action in any suitable manner.

In particular embodiments, the assistant system 140 may receive an indication of a trigger action from a client system 130 of a user of an online social network. The trigger action may be associated with a user activity of the user of the client system 130. As an example and not by way of limitation, the assistant system 140 may receive an indication that a user on his smartphone just took a photo at a particular geographic location. The trigger action may be the user taking the photo. In particular embodiments, the trigger action may include clicking on a composer interface. As an example and not by way of limitation, a user may click on a text input box within a social-networking application to input text and/or other content to post to the online social network. In particular embodiments, the trigger action may include browsing a content object on an online social network for more than a threshold amount of time. As an example and not by way of limitation, the user may be scrolling through his newsfeed and pause on a post for at least 10 seconds. In particular embodiments, the trigger action may include one or more of uploading a content object to the online social network, updating a user status on the online social network, capturing an image with the client system 130, or receiving a content object from a second user associated with the online social network. In particular embodiments, the trigger action includes checking-in at an entity associated with the online social network. As an example and not by way of limitation, a user may click to "check-in" into a page associated with a café to confirm the user is located at a geographic location associated with the café. In particular embodiments, the trigger action may include completing an achievement within an online game associated with the online social network. As an example and not by way of limitation, a user may complete a level of a round-based game or beat a boss within a game accessed via a gaming platform of the online social network. In particular embodiments, the trigger action may include being located within a threshold distance of a geographic location associated with a particular user context. As an example and not by way of limitation, the assistant system 140 may detect that the user is within 10 feet of the Golden Gate Bridge. Detection of trigger actions by the assistant system 140 may be subject to privacy settings associated with the user. Although this disclosure describes receiving an indication of particular trigger actions in a particular manner, this disclosure contemplates receiving indication of any suitable trigger actions in any suitable manner.

In particular embodiments, the assistant system 140 may determine a user context based on the trigger action. The assistant system 140 may determine a user state of the user and/or what the user is doing based on the identified trigger action. As an example and not by way of limitation, the assistant system 140 may determine a user is taking a photo at Niagara Falls when the assistant system 140 detects the user is taking a photo at a particular geographic location. In particular embodiments, the assistant system 140 may identify a user context associated with a trigger action from a context index that contains in index of a plurality of user contexts. Each of the user contexts in the context index may be associated with parameters that are indicative of the respective user context. As an example and not by way of limitation, if the trigger action is taking a photo with the client system 130, then the assistant system 140 may identify that the user context is taking a photo and further determine that the user is taking a photo at a specific place (e.g., Niagara Falls). In particular embodiments, the parameters of the user context may include one or more entities associated with the user context, a geographic location of the one or more entities associated with the user context, a data associated with the user context, or a time associated with the user context. Other parameters may be included to specify a user context. In particular embodiments, the assistant system 140 may calculate a context-probability score for each identified user context based on a comparison of parameters associated with the identified user context and information associated with the trigger action. As an example and not by way of limitation, information of the trigger action may include geographic location (e.g., Niagara Falls) of where the trigger action occurred, as well as a time (3:05 PM) which may both be compared to the parameters (e.g., a geographic location parameter and time parameter) of an identified user context. In particular embodiments, the assistant system 140 may select a user context from the identified user contexts based on its calculated context-probability score. As an example and not by way of limitation, the assistant system 140 may select a user context associated with taking a photo at Niagara Falls in the afternoon based on the calculated context-probability score associated with the information (e.g., geographic location at Niagara Falls and time at 3:05 PM) of the trigger action. In particular embodiments, the user contexts may include various combinations of parameters. As an example and not by way of limitation, a user context may be identified as a user on vacation based on how far away a user is from his home location and if the user is located in a touristy location. Although this disclosure describes determining particular user contexts in a particular manner, this disclosure contemplates determining any suitable user contexts in any suitable manner.

In particular embodiments, the assistant system 140 may access recommended content objects associated with the user context. After the assistant system 140 determines the user context from the trigger action, the assistant system 140 may access content objects to recommend to the user of the client system 130 that are associated with the user context. As an example and not by way of limitation, the assistant system 140 may identify the user captured a photo at Niagara Falls at 3:05 PM and access posts to recommend the user to share. Continuing the example, the recommended posts may include text for the user to use with the photo the user captured to generate a post to share with his social network. In particular embodiments, the recommended content objects include one or more of a comment, an audio clip, an image, a video, a link, a message, or a review. In particular embodiments, the link may be a Uniform Resource Locator (URL) or a deep link to content in another application. Although this disclosure describes accessing recommended content objects associated with the user context in a particular manner, this disclosure contemplates accessing recommended content objects associated with the user context in any suitable manner.

In particular embodiments, the assistant system 140 may generate a context index storing a plurality of contexts. The context index may store information for the assistant system 140 to later access and generate content suggestions from. In particular embodiments, the assistant system 140 may access a plurality of content objects that each have one or more social signals. As an example and not by way of limitation, the assistant system 140 may access all posts on an online social network that include a social signal (e.g., likes, comments, shares, or views, etc.). In particular embodiments, the assistant system 140 may identify content objects based on their social signals. As an example and not by way of limitation, posts that have over a threshold amount of a social signal (e.g., 50 likes) may be identified by the assistant system 140. This may be to determine which posts have a high level of social interaction. In particular embodiments, each social signal may be weighted differently. As an example and not by way of limitation, the number of likes of a post may contribute to the post's social interaction score differently than the number of shares of a post. Continuing the example, the assistant system 140 may weigh the number of "shares" of a post to be 10 times more than a single "like." In particular embodiments, the threshold level of social signals may be a flat number, a percentage of a user's online social network, or a combination of the two. As an example and not by way of limitation, if at least 25% of a user's online social network interacts with a post, then that post may have generated a threshold amount of interactions to meet the threshold level of social signals. In particular embodiments, each content object includes content metadata. As an example and not by way of limitation, each post may have metadata associated with the post, such as geographic location associated with the post, time posted, content of the post, and the like. In particular embodiments, the assistant system 140 may determine a user context associated for each identified content object based on its content metadata. As an example and not by way of limitation, for a post about the Niagara Falls at 3:05 PM, the assistant system 140 may determine the post is representative of the user context, "Niagara Falls posts during the afternoon." In particular embodiments, the assistant system 140 may aggregate the identified content objects into aggregated sets based on the user contexts associated with the content objects. As an example and not by way of limitation, the assistant system 140 may aggregate two posts about the Niagara Falls that were posted between 12:00 PM and 5:00 PM to the aggregated set that is associated with the user context, "Niagara Falls posts during the afternoon." In particular embodiments, an aggregated set and/or a content object may be associated with one or more user contexts. In particular embodiments, each content object within an aggregated set have a similarity measure with respect to each other greater than a threshold similarity score. The similarity score may be based on the content of the content object or the content metadata. As an example and not by way of limitation, posts that have the same geographic location and were posted within a period of time of the day may be aggregated into an aggregated set. In particular embodiments, the assistant system 140 may select one or more aggregated sets based on a number of content objects within the aggregated set. As an example and not by way of limitation, if the aggregated set has at least 1000 posts, then the assistant system 140 may select the aggregated set. In another example and not by way of limitation, the aggregated set may include a particular content object that has a large amount of social signals (e.g., over 1 million) and the aggregated set may be selected as a result. In particular embodiments, the assistant system 140 may generate a set of parameters indicative of a user context based on the content metadata of the content objects in the aggregated set. As an example and not by way of limitation, the assistant system 140 may generate parameters including a geographic location at Niagara Falls, time range between 12:00 PM-5:00 pm, and an action as capturing a photo to be a user context. The parameters may be based on the posts within an aggregated set of posts. In particular embodiments, the assistant system 140 may store the parameters for each user context as a record in the context index. In particular embodiments, the assistant system 140 may analyze content objects of the aggregated set associated with a user context to extract content representative of the user context. As an example and not by way of limitation, the assistant system 140 may extract phrases associated with posts in the aggregated set, such as "I'm enjoying the views here at Niagara Falls!" In particular embodiments, the assistant system 140 may generate sets of recommended content objects associated with the user context based on the extracted content. In particular embodiments, the assistant system 140 may store the set of recommended content objects with the record for the user context in the context index. In particular embodiments, the assistant system 140 may identify content objects and/or user contexts that have a high level of negative sentiment associated with the content object and/or user context. As an example and not by way of limitation, the assistant system 140 may identify a post that has a large amount of negative comments or comments expressing negative sentiment. In particular embodiments, the assistant system 140 may filter one or more recommended content objects associated with a negative user sentiment. In particular embodiments, the assistant system 140 may provide a content suggestion to not post a content object in response to determining the content object is associated with a user context that has a negative user sentiment. Although this disclosure describes generating a context index storing a plurality of contexts in a particular manner, this disclosure contemplates generating a context index storing a plurality of contexts in any suitable manner.

In particular embodiments, the assistant system 140 may calculate a recommendation score for each recommended content object. The assistant system 140 determines which content objects to recommend the user of the client system 130 by calculating a recommendation score for the recommended content objects. As an example and not by way of limitation, the assistant system 140 may calculate a recommendation score for a particular post about Niagara Falls to determine whether to recommend the user to share the particular post. In particular embodiments, each user may have a user recommendation profile that may tailor recommendations for a particular user. As an example and not by way of limitation, the user may be connected to users (e.g., friends) on the online social network who do not interact with content associated with a particular category (e.g., technology) and so may not be recommended to post content associated with that category. Continuing the example, the user may be a prolific sharer and have identified particular content that his or her friends on an online social network may expect and like from the user. The assistant system 140 may further recommend the user to share content similar to the identified content. In particular embodiments, the calculation of the recommendation score includes calculating a global-recommendation score and a personalized-recommendation score for each recommended content object. In particular embodiments, the personalized-recommendation score for each recommended content object is calculated based on a comparison of content metadata of the recommended content object to content metadata of content objects associated with the user. As an example and not by way of limitation, the assistant system 140 determines how similar is the user context of a photo to post compared to the user context of other photos previously shared by the user based on a comparison of the content metadata of the photos. In particular embodiments, the global-recommendation score for each recommended content object is calculated based on a comparison of content metadata of the recommended content object to content metadata of one or more content objects associated with a popular global user context. As an example and not by way of limitation, the assistant system 140 determines how similar is the user context of a photo to post compared to identified popular photos posted on the online social network. In particular embodiments, different weights may be assigned to the personalized-recommendation score and the global-recommendation score when calculating the recommendation score for each recommended content object. As an example and not by way of limitation, the assistant system 140 may calculate the recommendation score using the following algorithm:

$$S=f(a*s_p+b*s_g)$$

where:
S denotes the recommendation score,
a is a first weight,
$s_p$ denotes the personalized-recommendation score,
b is a second weight, and
$s_g$ denotes the global-recommendation score.

Although this disclosure describes calculating a recommendation score for each recommended content object in a particular manner, this disclosure contemplates calculating a recommendation score for each recommended content object in any suitable manner.

In particular embodiments, the assistant system 140 may generate a content suggestion that includes a recommended content object that has a recommendation score above a threshold recommendation score. The assistant system 140 may generate multiple content suggestions for the user, each of which may include one of the recommended content objects that has a recommendation score above a threshold recommendation score. As an example and not by way of limitation, the assistant system 140 may generate post recommendations including the recommended posts for the user. In particular embodiments, the content suggestions may include suggestions for the user to perform an action in response to the trigger action. In particular embodiments, the suggested action may include one or more of capturing an image, recording a video, or interacting with a content object. As an example and not by way of limitation, the assistant system 140 may detect the user is nearby Niagara Falls at a geographic location that is associated with a "popular" user context or a user context that has generally received a large amount of social interaction when people share posts about it. Continuing the example, the user may receive a recommendation to capture a photo in the same location that previous users have taken photos. As another example and not by way of limitation, the assistant system 140 may detect the user is scrolling through his newsfeed and recommend the user to read an article and post about the article. In particular embodiments, the assistant system 140 may show a preview of content objects generated at the geographic location. Although this disclosure describes generating a content suggestion that includes a recommended content object in a particular manner, this disclosure contemplates generating a content suggestion that includes a recommended content object in any suitable manner.

In particular embodiments, the assistant system 140 may send instructions to present content suggestions to the client system 130 of the user in response to the trigger action. As an example and not by way of limitation, the client system 130 may display the content suggestions to create posts about a recently captured photo to the user. In particular embodiments, each content suggestion is operable to allow the user to select a corresponding recommended content object. In particular embodiments, the selection of a content suggestion may generate a post based on the content suggestion that corresponds to the recommended content object. As an example and not by way of limitation, following the user recently took a photo of Niagara Falls and the assistant system 140 has generated content suggestions of creating a post about Niagara Falls including the captured photo, the user may select a suggestion to create the post about Niagara Falls. Continuing the example, subsequently to the user selecting the content suggestion, the assistant system 140 may post the photo of Niagara Falls to the user's online social network. In particular embodiments, the recommended content object may include primed text to include when the user selects the recommended content object. As an example and not by way of limitation, the recommended post may include a caption, such as "I'm glad I got to visit!" to be included with the recommended post. In particular embodiments, the assistant system 140 may use the user context engine 225 to generate primed text that is personalized with the user's lexicon. More information on priming text for posts may be found in U.S. patent application Ser. No. 15/967,279, filed 30 Apr. 2018, which is incorporated by reference. More information on personalizing primed text for a user may be found in the U.S. patent application Ser. No. 15/966,455, filed 30 Apr. 2018, which is incorporated by reference. In particular embodiments, the assistant system 140 may monitor the social signals of the recommended content object. As an example and not by way of limitation, the assistant system 140 may keep track of how many likes, comments, views, shares, and the like that the recommended post has received. In particular embodiments, the assistant system 140 may update a user profile associated with the user based on the social signals associated with the recommended content object. As an example and not by way of limitation, the assistant system 140 may determine that the post it recommended the user to post has met a threshold social signal (e.g., 50 likes) and update the user profile to identify the recommended post as a good recommendation. Alternatively, as another example and not by way of limitation, the assistant system 140 may identify recommended posts as bad recommendations and record that within a user's user profile if the recommended post failed to exceed a threshold social signal (e.g., 10 likes). In particular embodiments, the assistant system 140 may wait a predetermined amount of time before determining whether the recommended content object has met a threshold social signal. In particular embodiments, any changes (e.g., more comments, likes, or unlikes, etc.) may be reflected in the recommended content object if the changes occurred after the first evaluation and may further change the recommended content object as a low-quality recommendation to a high-quality recommendation. There may be a range of social signals expected for a recommended content object to classify the recommended content object as a good recommendation. As an example and not by way of limitation, the assistant system 140 may determine an average level of social signals that users receive for a post of the same or similar user context. The level of social signals may be a predetermined number or a fraction of the user's online social network. The low end of the range may be determined as at least a percentage of the average (e.g., 90% of the average amount of social signals). If the recommended content object has been labeled a high-quality recommendation, the assistant system 140 may continue to recommend the user to share similar posts (e.g., posts of a similar category). Therefore, in particular embodiments, if the user's online social network highly interacts with photos of nature, then the assistant system 140 may recommend the user to continue to post more photos of nature. However, in particular embodiments, if the post has been labeled a low-quality recommendation (e.g., failing to receive a threshold level of social signals) then the assistant system 140 may reduce the amount (or eliminate) of post recommendations for the category associated with the low-quality recommendation. The user may also reject to share a post and the assistant system 140 may track whenever the user rejects a recommendation. The rejections may be incorporated to reduce the amount of recommendations to the user. As an example and not by way of limitation, the assistant system 140 may know to reduce the amount of recommendations for the user to share photos of dinners with friends. The rejection of a recommendation to generate a post may also include feedback as to why the user is rejecting the recommendation (e.g., posted too much today, wants to keep to themselves today, too busy, wants to keep it to himself or herself, etc.). Although this disclosure describes sending instructions to present content suggestions in a particular manner, this disclosure contemplates sending instructions to present content suggestions in any suitable manner.

Figure 4:
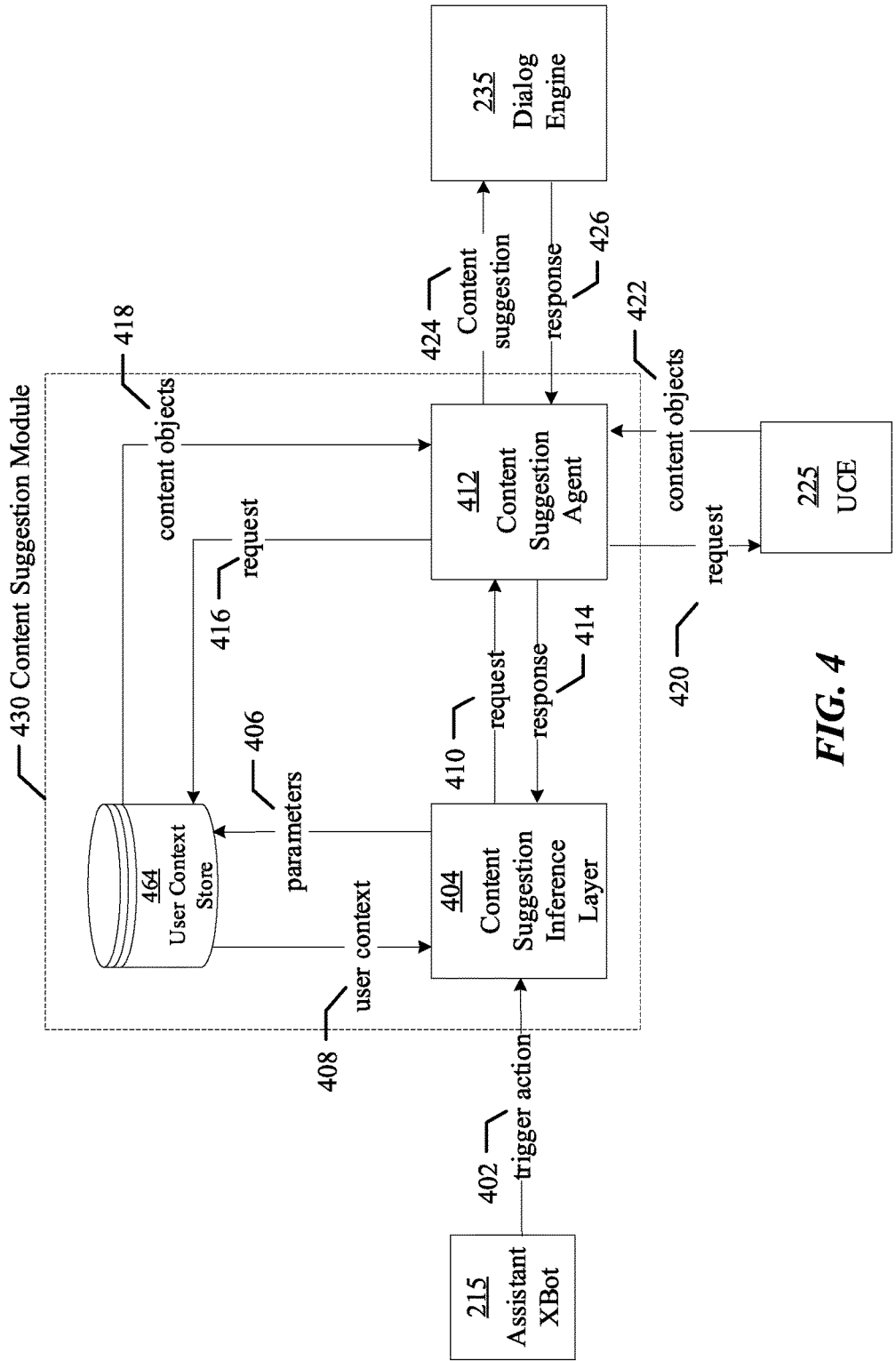
FIG. 4 illustrates an example diagram flow of generating content suggestions for a user.

FIG. 4 illustrates an example diagram flow 400 of generating content suggestions for a user. The process begins with the assistant xbot 215 sending an indication of a trigger action 402 to a content suggestion inference layer 404. The indication of the trigger action 402 may be associated with a user activity of the user. In particular embodiments, the content suggestion inference layer 404 may analyze the indication of the trigger action 402 to determine one or more parameters 406 that are indicative of the user activity in order to identify a user context 408 associated with the indication of the trigger action 402. As an example and not by way of limitation, the content suggestion inference layer 404 may determine the trigger action of taking a photo is associated with a geographic location located at the Grand Canyon and the photo was taken at 3:05 PM on Jun. 14, 2016. Continuing the example, the content suggestion inference layer 404 may identify a geographic location parameter as the "Grand Canyon," a date parameter as "Jun. 14, 2016," a time parameter as "3:05 PM," and an action parameter as "capturing a photo." The content suggestion inference layer 404 may send the parameters 406 to a user context store 464, which returns a user context 408 identified based on the parameters 406. The user context store 464 may be a user context index stored in a data store 164, which the user context store 464 uses to compare the parameters 406 with a plurality of user contexts. After the content suggestion inference layer 404 receives the user context 408 from the user context store 464, the content suggestion inference layer 404 may send a request 410 for content suggestions for the user to a content suggestion agent 412. The content suggestion agent 412 may receive the request 410, which may include information indicative of the user context 408. The request 410 may include the parameters 406 associated with the user context 408 or a user context 408 identifier. The content suggestion agent 412 may send a response 414 of receiving the request 410 from the content suggestion inference layer 404. The content suggestion agent 412 may send a request 416 to the user context store 464 for recommended content objects 418 from the user context store 464. The user context store 464 may receive the request and identify one or more content objects to recommend based on the user context 408 associated with the request 416. As an example and not by way of limitation, the user context store 464 may receive a request 416 for content objects associated with the user context 408, "Niagara Falls posts during the summer." In particular embodiments, the user context store 464 may access a data store 164 to find one or more recommended content objects 418 associated with the user context 408. In particular embodiments, the user context store 464 may store the one or more recommended content objects 418. In particular embodiments, if the indication of the trigger action 402 includes a content object (e.g., a photo), the content suggestion agent 412 may incorporate the content object with one or more recommended content objects 418. After receiving the recommended content objects 418, the content suggestion agent 412 may send another request 420 to the user context engine 225 for content objects 422 associated with the user. The personal content objects 422 may be content objects that the user has created or interacted with. The content suggestion agent 412 may calculate a recommendation score for each recommended content object 418 based on comparisons of the content metadata to personal content objects 422 and general identified content objects that may be received from the social-networking system 160. In particular embodiments, the content suggestion agent 412 may store information associated with general identified content objects to compare the content metadata of the content objects 418 with. After calculating the recommendation scores for each recommended content objects 418, the content suggestion agent 412 may generate content suggestions 424 to send to the dialog engine 235. After generating the content suggestions 424, the content suggestion agent may send a follow-up response 414 to the content suggestion inference layer 404 to confirm that the content suggestion agent 412 has generated content suggestions 424. The dialog engine 235 may send a response 426 to confirm the receipt of the content suggestions 424 and also further feedback. In particular embodiments, the dialog engine 235 may send a response 426 including a content suggestion 424 that the user has selected. In particular embodiments, the content suggestion inference layer 404, the content suggestion agent 412, and the user context store 464 may be included in a content suggestion module 430. The content suggestion module 430 may perform the functionalities of each of the content suggestion inference layer 404, the content suggestion agent 412, and the user context store 464. In particular embodiments, the assistant xbot 215 may send the indication of the trigger action 402 to the content suggestion module 430. In particular embodiments, the content suggestion module 430 may interface the user context engine 225 and the dialog engine 235 directly. In particular embodiments, after the dialog engine 235 receives the content suggestion 424, the dialog engine 235 may send the content suggestion 424 to the CU composer 270. The CU composer 270 may present the content suggestion 424 to the user by generating text associated with the content suggestion 424. As an example and not by way of limitation, if the content suggestion 424 includes sharing a photo of Niagara Falls, the CU composer 270 may add the caption, "I'm glad to see this beautiful view at Niagara Falls!" Additionally, in particular embodiments, the CU composer 270 may use the NLG 271 to incorporate the user's vocabulary. As an example and not by way of limitation, the NLG 271 may modify an original caption, "I'm glad to see this beautiful view at Niagara Falls!" to a new caption, "I'm ecstatic to enjoy this beauty of a view at Niagara Falls!" The use of the NLG 271 personalizes the caption to embody the user's vocabulary.

Figure 5:
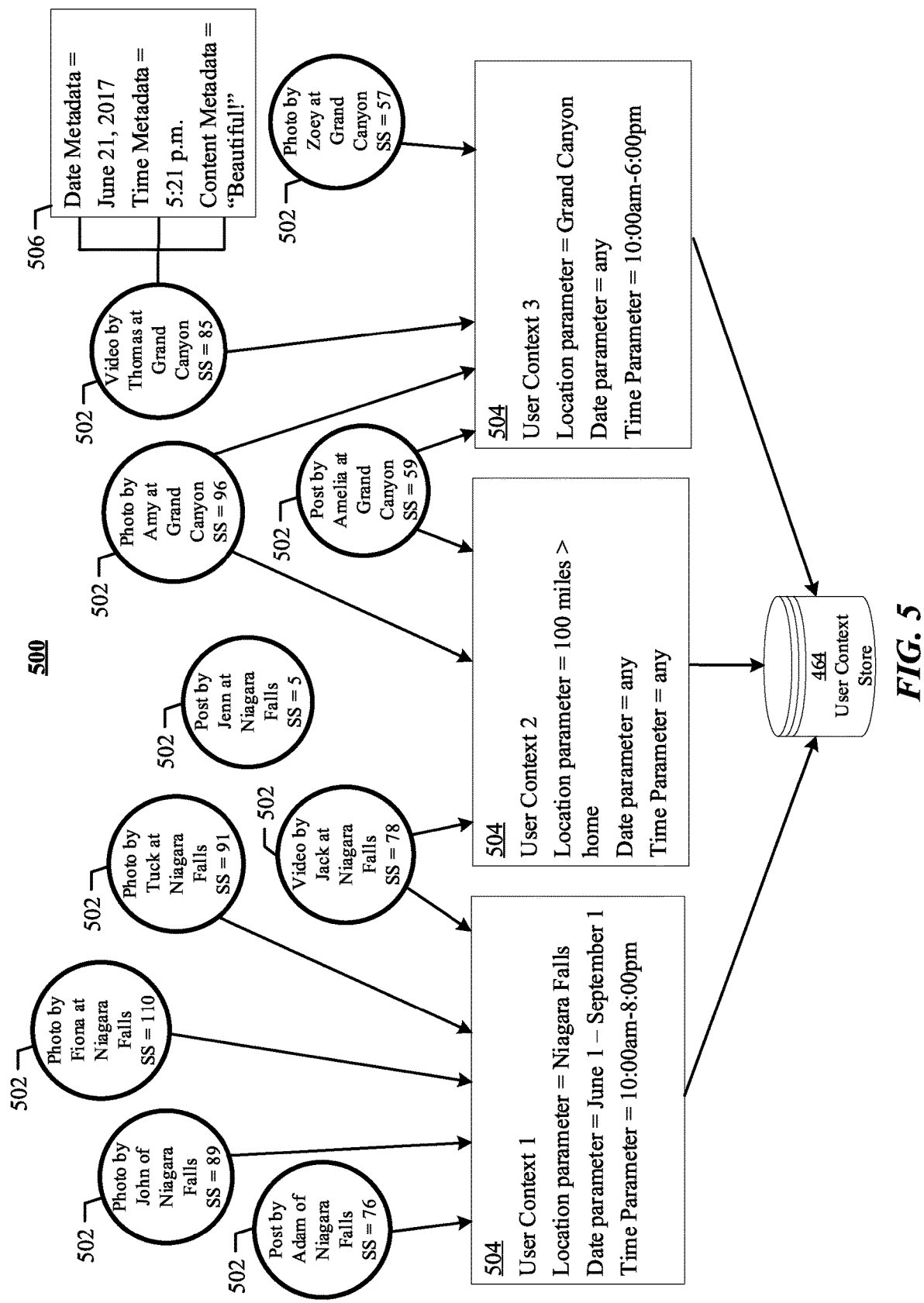
FIG. 5 illustrates an example process of aggregating content objects into user contexts and storing the user contexts into a user context store.

FIG. 5 illustrates an example process 500 of aggregating content objects into user contexts and storing the user contexts into a user context store. In particular embodiments, the assistant system 140 may identify a plurality of content objects 502 of an online social network. The assistant system 140 may identify the social signals ("SS") associated with each content object 502. The content objects 502 identified to have a social signal above a threshold social signal may be aggregated into one or more user contexts 504 based on the content metadata 506 of the content objects 502. Content objects 502 that do not have a social signal above a threshold social signal may be excluded from the aggregation. As an example and not by way of limitation, several posts about Niagara Falls may be aggregated into a user context 504 about Niagara Falls. The assistant system 140 may determine the content metadata 506 of a content object 502 as shown in FIG. 5. The assistant system 140 may use the content metadata 506 to generate one or more user contexts 504. As an example and not by way of limitation, if the assistant system 140 identifies the location metadata for several posts is "Niagara Falls," the assistant system 140 may generate a user context associated with "Niagara Falls." Continuing the example, other metadata may be added to the user context, such as date metadata and time metadata of the content objects 502. The assistant system 140 identifies "popular" user contexts 504 or user contexts 504 associated with a high level of interaction based the social signals associated with the content objects 502 of the user context 504. By identifying the content objects 502 that have a high level of interaction (e.g., social signals) the assistant system 140 may identify the user context 504 that another user can replicate to achieve a high level of interaction with his or her content objects 502 as well. As an example and not by way of limitation, if the assistant system 140 identifies that taking photos of Niagara Falls and posting the photos on an online social network yields a high level of interaction with a user's online social network, then the assistant system 140 may provide recommendations for the user to share photos of Niagara Falls (that the user has taken or will take) so the user would have a high level of interaction with his or her friends on an online social network. The assistant system 140 may store information associated with the identified user contexts 504 in a user context store 464. As an example and not by way of limitation, the assistant system 140 may store a record of the information associated with each user context 504 in the user context store 464.

Figure 6:
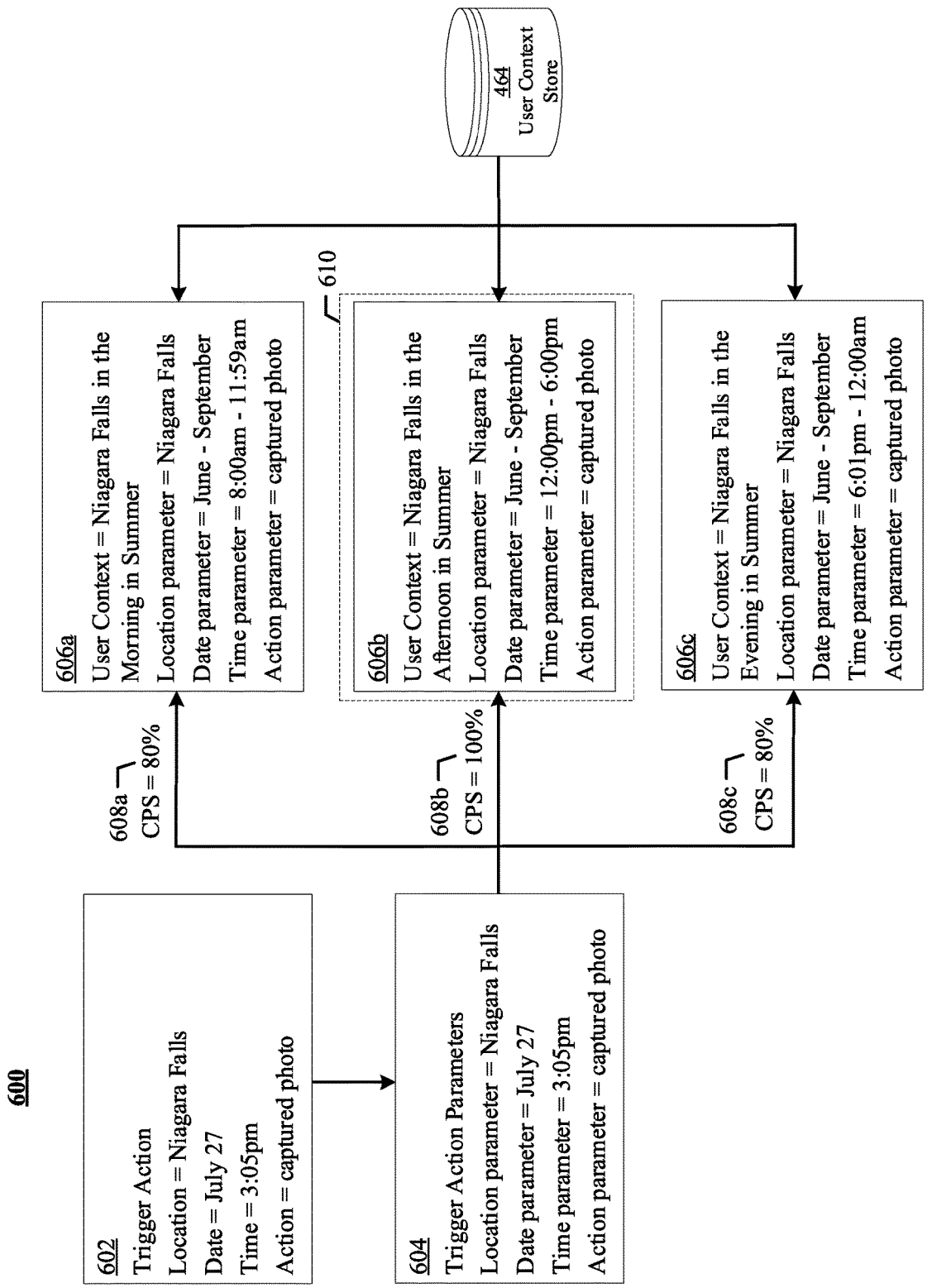
FIG. 6 illustrates an example process of determining a user context associated with a trigger action received from a client system of the user.

FIG. 6 illustrates an example process 600 of determining a user context associated with a trigger action received from a client system 130 of the user. In particular embodiments, the assistant system 140 may monitor for a trigger action 602. This may be subject to approval by the user (e.g., the user must approve of the assistant system 140 monitoring for a trigger action). Detection of trigger actions by the assistant system 140 may be subject to privacy settings associated with the user. After the trigger action 602 is detected by the assistant system 140, the assistant system 140 may identify trigger action parameters 604 of the trigger action 602. In particular embodiments, the assistant system 140 may determine trigger action parameters 604 from when a trigger action 602 occurred. As an example and not by way of limitation, if the assistant system 140 detects a trigger action 602, the assistant system 140 may identify where, when, and what happened that is associated with the trigger action 602. Therefore, if the assistant system 140 receives the trigger action 602 from a client system 130, then the assistant system 140 may determine the geographic location of the client system 130, a date and time of when the trigger action 602 was received, and other parameters that may be associated with the trigger action 602. After the trigger action parameters 604 have been determined, the assistant system 140 may access a user context store 464 to retrieve information/records of one or more user contexts 606 to calculate a context-probability score based on the trigger action parameters 604. In particular embodiments, the assistant system 140 may send a request to the social-networking system 160 to access the user context store 464. The assistant system 140 may use the trigger action parameters 604 to access information/records of user contexts 606a-606c that most resemble the user context associated with the trigger action parameters 604. This may be done by performing a query within the user context store 464 for at least one trigger action parameter 604. The assistant system 140 may proceed to calculate a context-probability score 608a-608c for each of the identified user contexts 606a-606c. The assistant system 140 may determine a user context 606 that best resembles the user context associated with the trigger action 602 based on the context-probability score 608b. The calculation of the context-probability score 608 may be based on a comparison of the trigger action parameters 604 to parameters associated with each of the identified user contexts 606a-606c. The assistant system 140 may determine a user context 610 associated with the trigger action 602 after calculating the context-probability scores 608a-608c for each identified user context 606a-606c. In particular embodiments, the assistant system 140 may use one or more of location parameters, date parameters, time parameters, or action parameters to calculate the context-probability scores 608. In particular embodiments, the assistant system 140 may use other parameters to determine calculate the context-probability scores 608.

Figure 7:
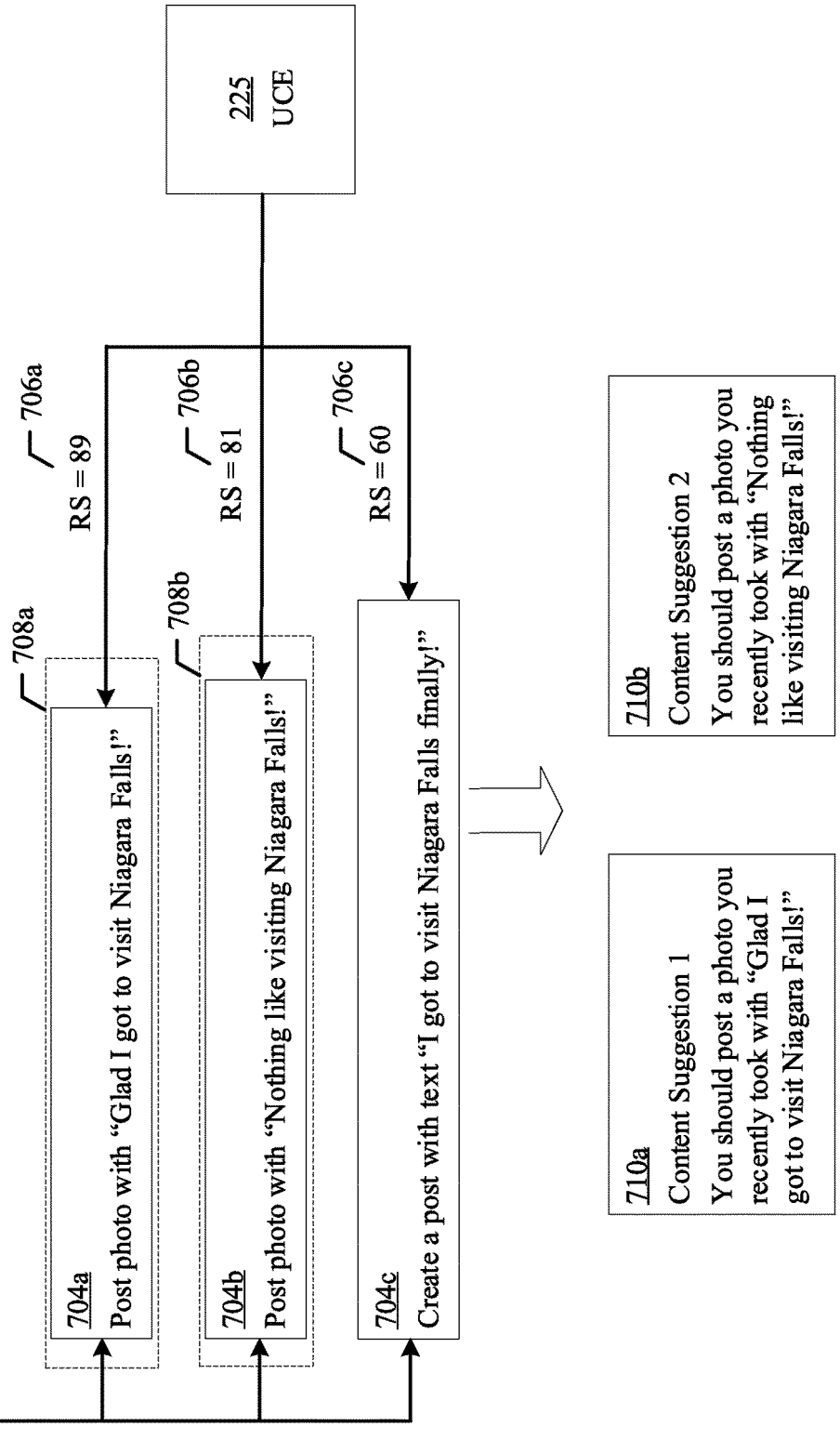
FIG. 7 illustrates an example process of generating content suggestions for the user.

FIG. 7 illustrates an example process 700 of generating content suggestions for a user. In particular embodiments, after an assistant system 140 determines a user context associated with a trigger action as describe in process 600, then the assistant system 140 may access a record of the user context from a user context store 464 to retrieve one or more recommended content objects 704a-704c associated with the user context. The assistant system 140 may access a user context engine 225 to calculate recommendation scores 706a-706c for each recommended content object 704a-704c. The recommendation scores 706a-706c may be calculated based on a comparison of content metadata associated with content objects that the user has generated or interacted with the content metadata associated with each recommended content object 704a-704c. The assistant system 140 may also compare the content metadata associated with the recommended content objects 708 to content objects associated with a global user context. After determining one or more recommendation scores 706a-706c, the assistant system 140 may determine which recommended content objects 704a-704c scored above a threshold recommendation score. After determining the content objects 708a-708b that scored above a threshold recommendation score, the assistant system 140 may generate content suggestions 710a-710b associated with the content objects 708a-708b. In particular embodiments, the content suggestions 710a-710b may include a content object associated with the trigger action. As an example and not by way of limitation, if the trigger action is a user taking a photo, the content suggestion 710 may include the photo along with the content object 708. The assistant system 140 may send instructions to the client system 130 to present the content suggestions 710a-710b to the user for him or her to select.

Figure 8E:
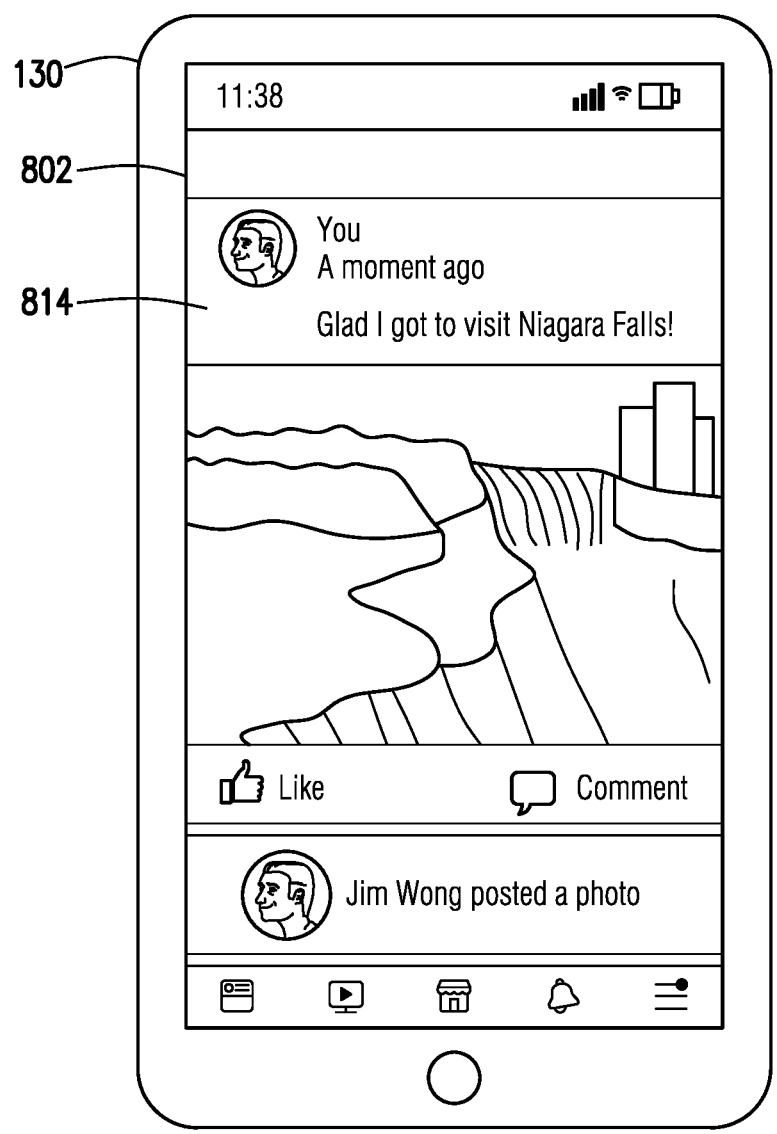

FIGS. 8A-8E illustrate an example process of receiving content suggestions on a client system 130 or a user. Referring to FIG. 8A, a client system 130 may be in a photo taking context 802. In particular embodiments, the context 802 represents the contents of the screen displayed by the client system 130. The context 802 may include an activatable button 804 to capture a photo displayed within the context 802. In particular embodiments, the context 802 may include one or more activatable buttons associated with other functions of a camera application. As shown in FIG. 8A, a user may click on the activatable button 804 with a touch element 806. In particular embodiments, the touch element 806 may be a user's finger interacting with the touchscreen of the client system 130.

FIG. 8B illustrates the result of pressing the activatable button 804 with the touch element 806. The client system 130 may capture a photo and render the image for the user to see in context 802. Context 802 may change to include one or more activatable buttons 808a-808d. The activatable buttons 808a-808d may correspond to functions of a camera application. As shown in FIG. 8B, the user may select the activatable button 808b with his or her touch element 806. In particular embodiments, the activatable button 808b may be a save function to save the captured image of the photo displayed within the context 802. The client system 130 may save the photo in a data storage located on the client system 130. In particular embodiments, the client system 130 may save the photo in a data store 164 associated with a social-networking system 160.

FIG. 8C illustrates a period of time subsequent to the user capturing the image of FIG. 8B. In particular embodiments, the period of time may be any amount of time after the capture of the image. As an example and not by way of limitation, the period of time may be 10 minutes after the capture of the image. The context 802 displays a newsfeed associated with an online social network and the user may be browsing through content objects located within the newsfeed. In particular embodiments, the user may be in a different context 802. The assistant system 140 may detect the trigger action of capturing the image and saving the image as described in FIG. 8B. The assistant system 140 may proceed to implement the process 600 of determining a user context associated with the trigger action and the process 700 of generating content suggestions for the user. The client system 130 may present a notification 809 of received content suggestions from the assistant system 140. In particular embodiments, the content suggestions from the assistant system 140 may be displayed subsequently to the activation of a composer element (not shown). The composer element may be associated with the generation of content objects. As an example and not by way of limitation, the composer element may be a "status update box" where a user shares text inputs with his or her friends on an online social network. As shown in FIG. 8C, the user may select to open the notification 809 with a touch element 806. In particular embodiments, the user may select to open the content suggestions in other ways. As an example and not by way of limitation, the context 802 may include a content suggestions tab.

FIG. 8D illustrates the result of selecting to open notification 809, which the client system 130 may display a context 802 that includes content suggestions 810a-810b.

The content suggestions 810a-810b may include activatable buttons 812a-812d corresponding to functions associated with the content suggestions 810a-810b. The content suggestions 810a-810b may include a recommended content object for the user. The recommended content object may include text, a photo, a video, and other content a user may share. In particular embodiments, the content suggestions 810 may include an edit button 812a and a post button 812b. The edit button 812a may be associated with editing a content object associated with a content suggestion 810. The post button 812b may be associated with a direct link to share a content object associated with a content suggestion with a user's online social network. In particular embodiments, the context 802 may display the content object associated with the content suggestions 810a-810b. As an example and not by way of limitation, if the content suggestion recommends generating a post to share a photo that a user recently captured, the context 802 may include the photo the user recently captured. As another example and not by way of limitation, the content suggestion may be to share an article and the context 802 may include a snippet of the article the user has interacted with. As shown in FIG. 8D, the user may select the activatable button 812b to post the photo to the user's online social network.

FIG. 8E illustrates the result of selecting the activatable button 812b, which generates a post 814 to share to the user's online social network. Context 802 switches back to the newsfeed context and shows the recently posted content object 814. The content object 814 may include the photo and a recommended content object associated with the content suggestion 810a that the user selected.

Figure 9:
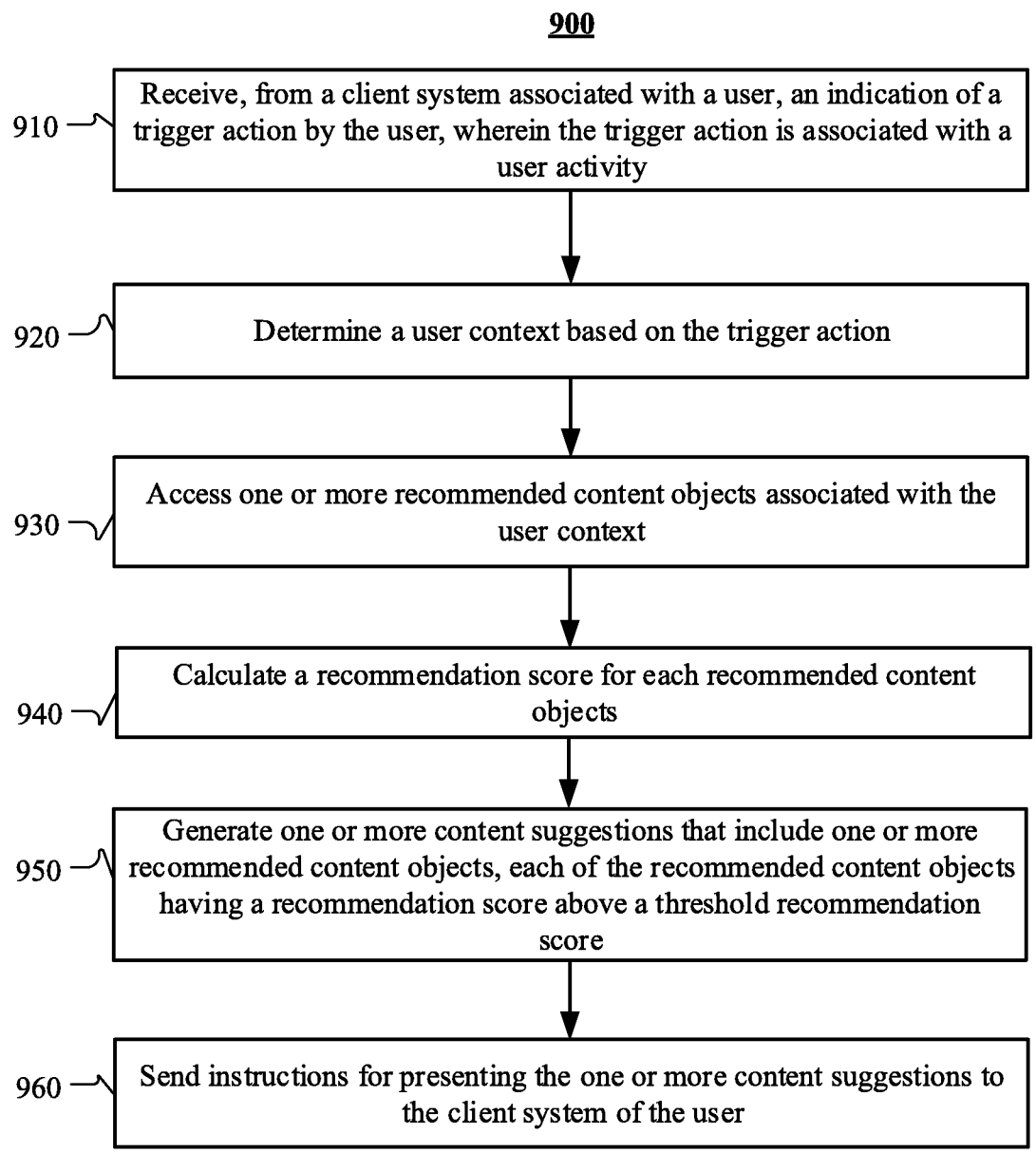
FIG. 9 illustrates an example method for providing content suggestions for the user.

FIG. 9 illustrates an example method 900 for providing content suggestions to a user of the client system 130. The method may begin at step 910, where the assistant system 140 may receive an indication of a trigger action by the user from the client system 130 associated with the user. The trigger action may be associated with a user activity. At step 920, the assistant system 140 may determine a user context based on the trigger action. At step 930, the assistant system 140 may access one or more recommended content objects associated with the user context. At step 940, the assistant system 140 may calculate a recommendation score for each recommended content object. At step 950, the assistant system 140 may generate one or more content suggestions comprising the one or more recommended content objects. Each content suggestion may correspond to a recommended content object having a recommendation score above a threshold recommendation score. At step 960, the assistant system 140 may send instructions for presenting the one or more content suggestions to the client system 130 of the user. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for providing content suggestions to a user including the particular steps of the method of FIG. 9, this disclosure contemplates any suitable method for providing content suggestions to a user including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graphs

Figure 10:
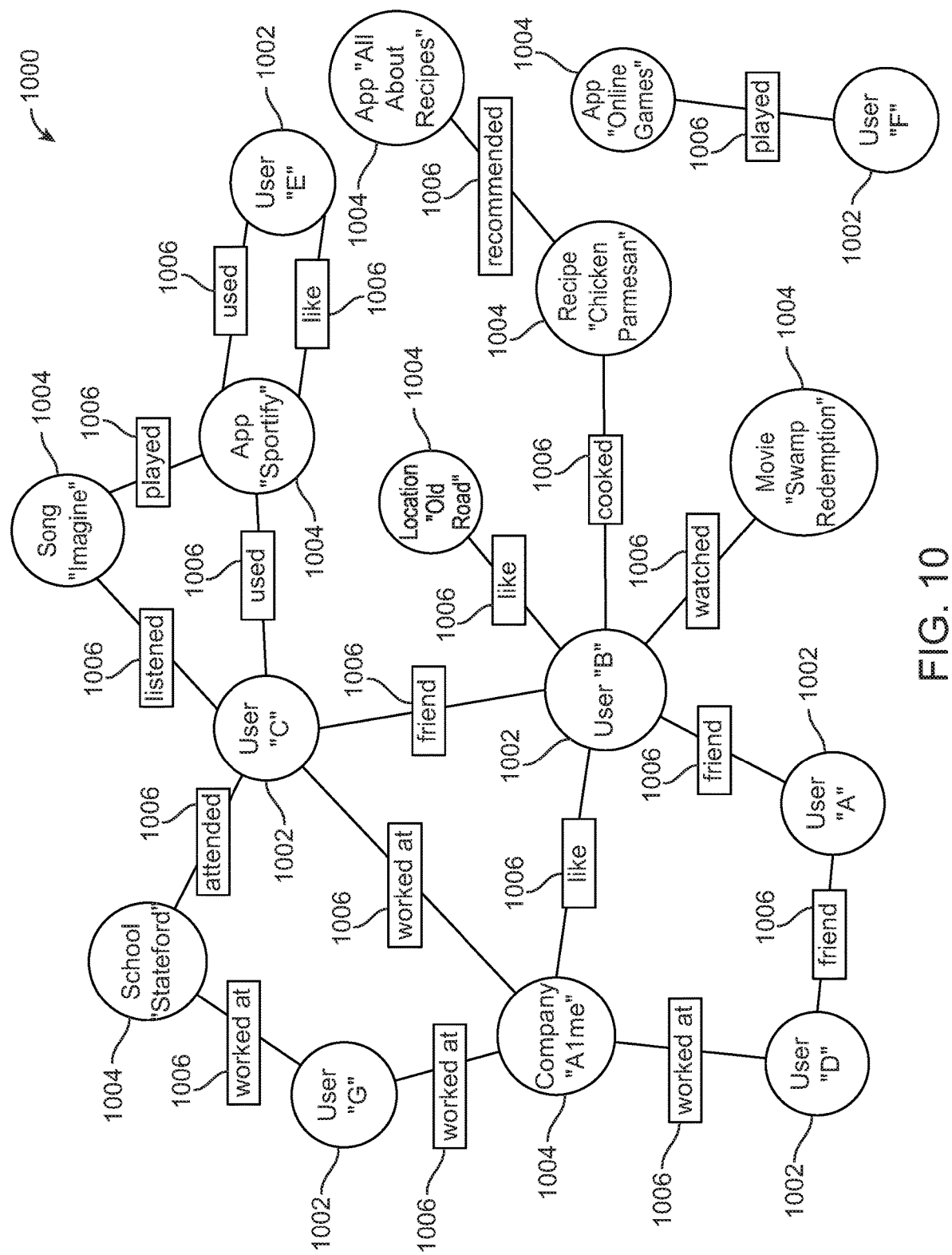
FIG. 10 illustrates an example social graph.

FIG. 10 illustrates an example social graph 1000. In particular embodiments, the social-networking system 160 may store one or more social graphs 1000 in one or more data stores. In particular embodiments, the social graph 1000 may include multiple nodes—which may include multiple user nodes 1002 or multiple concept nodes 1004—and multiple edges 1006 connecting the nodes. Each node may be associated with a unique entity (i.e., user or concept), each of which may have a unique identifier (ID), such as a unique number or username. The example social graph 1000 illustrated in FIG. 10 is shown, for didactic purposes, in a two-dimensional visual map representation. In particular embodiments, a social-networking system 160, a client system 130, an assistant system 140, or a third-party system 170 may access the social graph 1000 and related social-graph information for suitable applications. The nodes and edges of the social graph 1000 may be stored as data objects, for example, in a data store (such as a social-graph database). Such a data store may include one or more searchable or queryable indexes of nodes or edges of the social graph 1000.

In particular embodiments, a user node 1002 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with the social-networking system 160. In particular embodiments, a user node 1002 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more web interfaces.

In particular embodiments, a concept node 1004 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more web interfaces.

In particular embodiments, a node in the social graph 1000 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1004. Profile interfaces may be viewable by all or a selected subset of other users. As an example and not by way of limitation, a user node 1002 may have a corresponding user-profile interface in which the corresponding user may add content, make declarations, or otherwise express himself or herself. As another example and not by way of limitation, a concept node 1004 may have a corresponding concept-profile interface in which one or more users may add content, make declarations, or express themselves, particularly in relation to the concept corresponding to concept node 1004.

In particular embodiments, a concept node 1004 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1002 corresponding to the user and a concept node 1004 corresponding to the third-party web interface or resource and store edge 1006 in one or more data stores.

In particular embodiments, a pair of nodes in the social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1006 connecting the first user's user node 1002 to the second user's user node 1002 in the social graph 1000 and store edge 1006 as social-graph information in one or more of data stores 164. In the example of FIG. 10, the social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile interface corresponding to a concept node 1004 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, the social-networking system 160 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004).

In particular embodiments, the social-networking system 160 may create an edge 1006 between a user node 1002 and a concept node 1004 in the social graph 1000. As an example and not by way of limitation, a user viewing a concept-profile interface (such as, for example, by using a web browser or a special-purpose application hosted by the user's client system 130) may indicate that he or she likes the concept represented by the concept node 1004 by clicking or selecting a "Like" icon, which may cause the user's client system 130 to send to the social-networking system 160 a message indicating the user's liking of the concept associated with the concept-profile interface. In response to the message, the social-networking system 160 may create an edge 1006 between user node 1002 associated with the user and concept node 1004, as illustrated by "like" edge 1006 between the user and concept node 1004. In particular embodiments, the social-networking system 160 may store an edge 1006 in one or more data stores. In particular embodiments, an edge 1006 may be automatically formed by the social-networking system 160 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Vector Spaces and Embeddings

Figure 11:
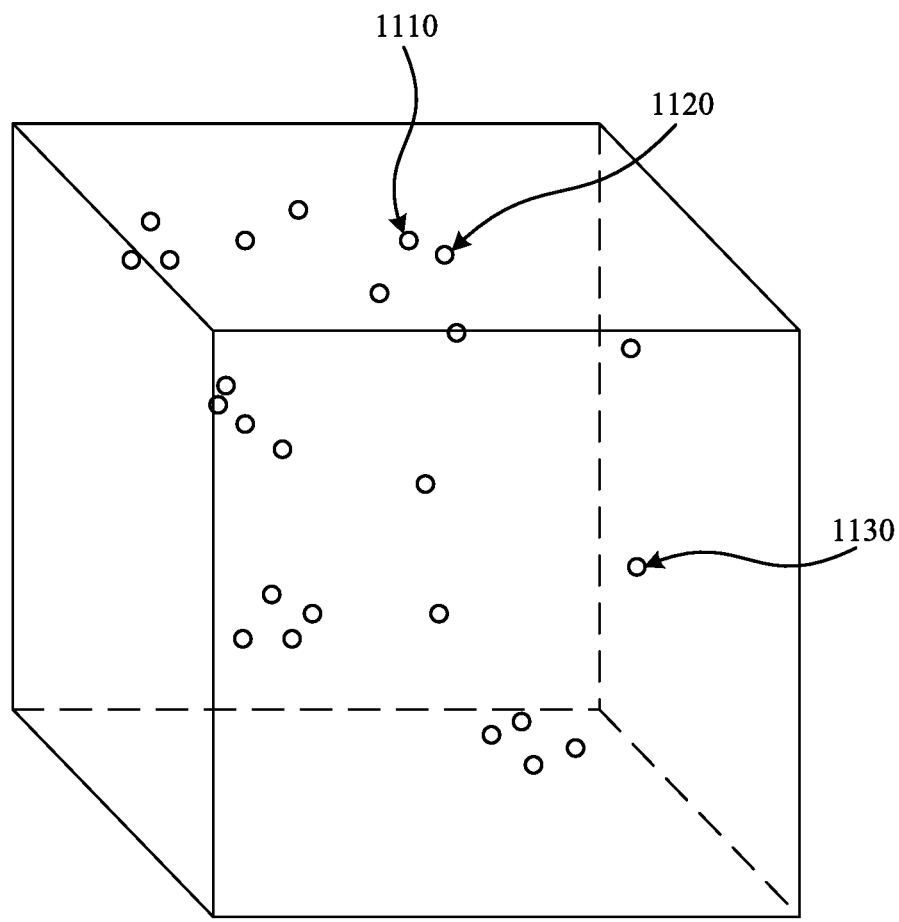
FIG. 11 illustrates an example view of an embedding space.

FIG. 11 illustrates an example view of a vector space 1100. In particular embodiments, an object or an n-gram may be represented in a d-dimensional vector space, where d denotes any suitable number of dimensions. Although the vector space 1100 is illustrated as a three-dimensional space, this is for illustrative purposes only, as the vector space 1100 may be of any suitable dimension. In particular embodiments, an n-gram may be represented in the vector space 1100 as a vector referred to as a term embedding. Each vector may comprise coordinates corresponding to a particular point in the vector space 1100 (i.e., the terminal point of the vector). As an example and not by way of limitation, vectors 1110, 1120, and 1130 may be represented as points in the vector space 1100, as illustrated in FIG. 11. An n-gram may be mapped to a respective vector representation. As an example and not by way of limitation, n-grams $t_1$ and $t_2$ may be mapped to vectors $v_{1\rightarrow}$ and $v_{2\rightarrow}$ in the vector space 1100, respectively, by applying a function $\pi_\rightarrow$ defined by a dictionary, such that $v_{1\rightarrow} = \pi_\rightarrow(t_1)$ and $v_{2\rightarrow} = \pi_\rightarrow(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1100. In particular embodiments, an n-gram may be mapped to a vector representation in the vector space 1100 by using a machine leaning model (e.g., a neural network). The machine learning model may have been trained using a sequence of training data (e.g., a corpus of objects each comprising n-grams).

In particular embodiments, an object may be represented in the vector space 1100 as a vector referred to as a feature vector or an object embedding. As an example and not by way of limitation, objects $e_1$ and $e_2$ may be mapped to vectors $v_{1\rightarrow}$ and $v_{2\rightarrow}$ in the vector space 1100, respectively, by applying a function $\pi_\rightarrow$ such that $v_{1\rightarrow} = \pi_\rightarrow(e_1)$ and $v_{2\rightarrow} = \pi_\rightarrow(e_2)$. In particular embodiments, an object may be mapped to a vector based on one or more properties, attributes, or features of the object, relationships of the object with other objects, or any other suitable information associated with the object. As an example and not by way of limitation, a function $\pi_\rightarrow$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\pi_\rightarrow$ may map the object to a vector using a transformed reduced set of features (e.g., feature selection). In particular embodiments, a function $\pi_\rightarrow$ may map an object e to a vector (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1100. A similarity metric may be a cosine similarity, a Minkowski distance, a Mahalanobis distance, a Jaccard similarity coefficient, or any suitable similarity metric. As an example and not by way of limitation, a similarity metric of $v_{1\rightarrow}$ and $v_{2\rightarrow}$ may be a cosine similarity $$\frac{\vec{v_1} \cdot \vec{v_2}}{\|\vec{v_1}\| \|\vec{v_2}\|}.$$

As another example and not by way of limitation, a similarity metric of $v_{1\rightarrow}$ and $v_{2\rightarrow}$ may be a Euclidean distance $\|v_{1\rightarrow} - v_{2\rightarrow}\|$. A similarity metric of two vectors may represent how similar the two objects or n-grams corresponding to the two vectors, respectively, are to one another, as measured by the distance between the two vectors in the vector space 1100. As an example and not by way of limitation, vector 1110 and vector 1120 may correspond to objects that are more similar to one another than the objects corresponding to vector 1110 and vector 1130, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 12:
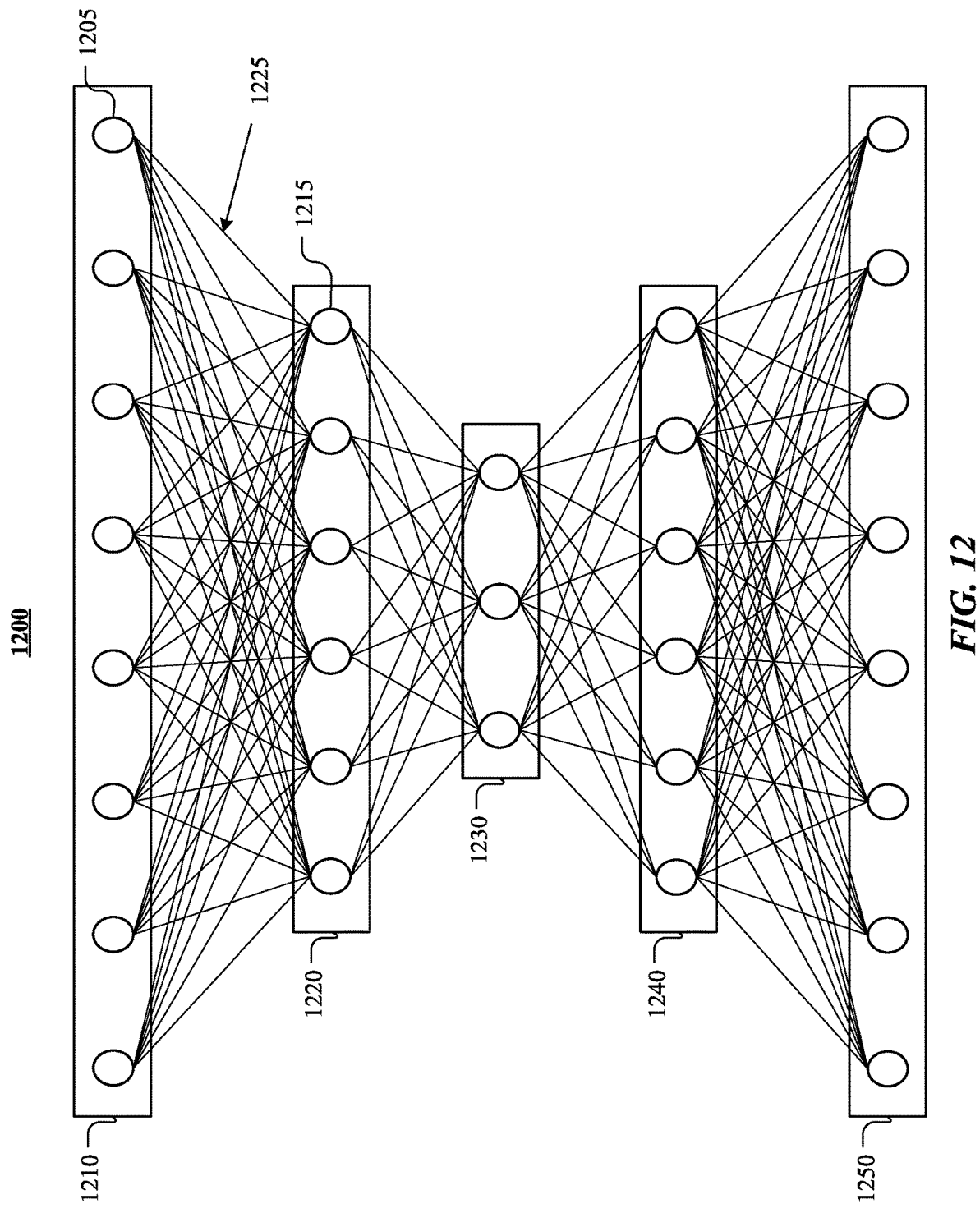
FIG. 12 illustrates an example artificial neural network.

FIG. 12 illustrates an example artificial neural network ("ANN") 1200. In particular embodiments, an ANN may refer to a computational model comprising one or more nodes. Example ANN 1200 may comprise an input layer 1210, hidden layers 1220, 1230, 1260, and an output layer 1250. Each layer of the ANN 1200 may comprise one or more nodes, such as a node 1205 or a node 1215. In particular embodiments, each node of an ANN may be connected to another node of the ANN. As an example and not by way of limitation, each node of the input layer 1210 may be connected to one of more nodes of the hidden layer 1220. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 12 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 12 depicts a connection between each node of the input layer 1210 and each node of the hidden layer 1220, one or more nodes of the input layer 1210 may not be connected to one or more nodes of the hidden layer 1220.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1220 may comprise the output of one or more nodes of the input layer 1210. As another example and not by way of limitation, the input to each node of the output layer 1250 may comprise the output of one or more nodes of the hidden layer 1260. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

me recliner $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1225 between the node 1205 and the node 1215 may have a weighting coefficient of 0.4, which may indicate that 0.4 multiplied by the output of the node 1205 is used as an input to the node 1215. As another example and not by way of limitation, the output $y_k$ of node k may be $y_k=F_k(s_k)$, where $F_k$ may be the activation function corresponding to node k, $s_k=\Sigma_j (w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1200 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1004 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

[99] In particular embodiments, privacy settings may be based on one or more nodes or edges of a social graph 1000. A privacy setting may be specified for one or more edges 1006 or edge-types of the social graph 1000, or with respect to one or more nodes 1002, 1004 or node-types of the social graph 1000. The privacy settings applied to a particular edge 1006 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1004 connected to a user node 1002 of the first user by an edge 1006. The first user may specify privacy settings that apply to a particular edge 1006 connecting to the concept node 1004 of the object, or may specify privacy settings that apply to all edges 1006 connecting to the concept node 1004. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for User Authentication and Experience Personalization Information In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 13:
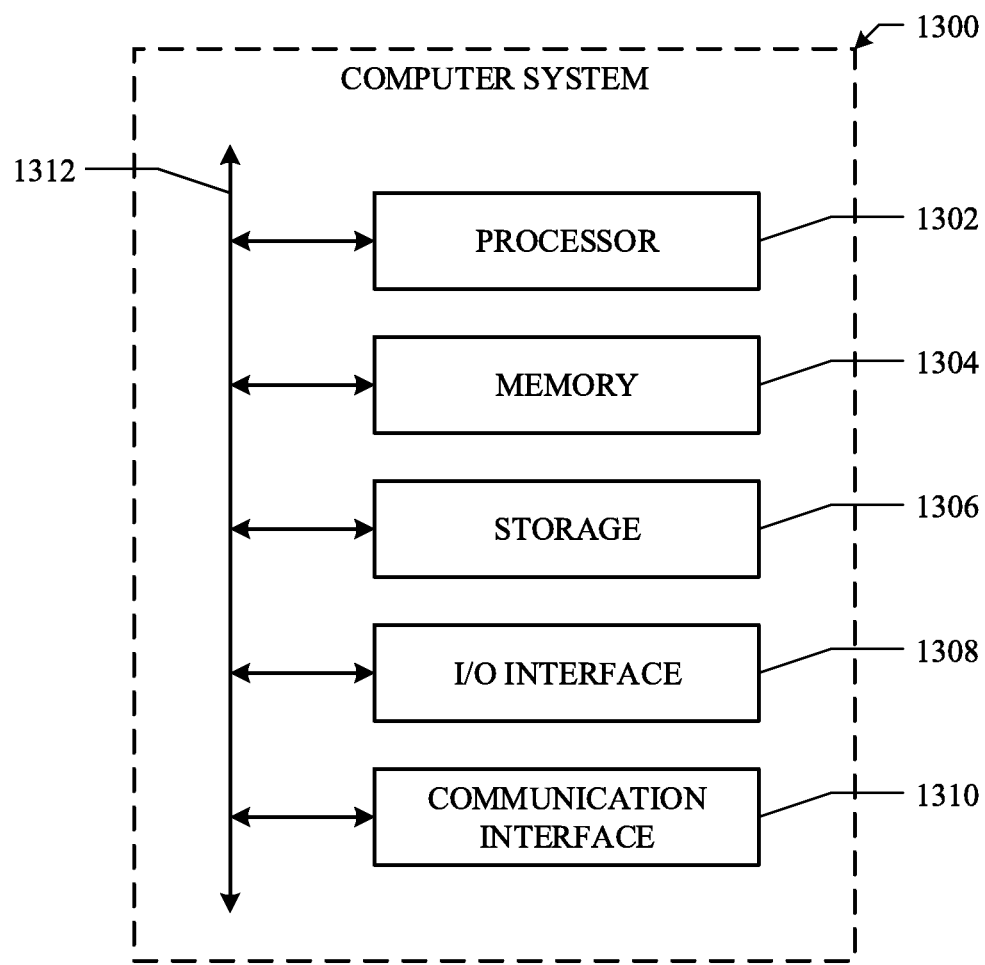
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, from a client system associated with a first user of an online social network, an indication of a trigger action by the first user, wherein the trigger action is associated with a user activity;
   determining, by the one or more computing systems, a first user context based on the trigger action;
   accessing, by the one or more computing systems, one or more recommended content objects associated with the first user context;
   calculating, by the one or more computing systems, a recommendation score for each recommended content object;
   generating, by the one or more computing systems, one or more content suggestions comprising one of the one or more recommended content objects, respectively, for the first user to share on the online social network, wherein each content suggestion corresponds to a recommended content object having a recommendation score above a threshold recommendation score; and
   sending, to the client system in response to the trigger action, instructions for presenting one or more of the content suggestions for the first user to share on the online social network, wherein each content suggestion comprises an activatable element selectable by the first user to share the corresponding recommended content object on the online social network.

2. The method of claim 1, wherein the trigger action comprises one or more of:
   clicking on a composer interface of the online social network;
   browsing a content object on the online social network for more than a threshold amount of time;
   uploading a content object to the online social network;
   updating a user status on the online social network;
   checking-in at an entity associated with the online social network;
   capturing an image with the client system;
   completing an achievement within an online game associated with the online social network;
   being located within a threshold distance of a geographic location associated with a particular user context; or
   receiving a content object from a second user associated with the online social network.

3. The method of claim 1, wherein determining the user context based on the trigger action comprises:
   identifying, from a context index, one or more user contexts that are associated with the trigger action, wherein each user context is associated with one or more parameters indicative of the user context;
   calculating, for each identified user context, a context-probability score for the identified user context based on a comparison of the parameters associated with the identified user context and information associated with the trigger action; and selecting, by the one or more computing systems, the first user context from the one or more identified contexts based on its calculated context-probability score.

4. The method of claim 3, wherein the one or more parameters comprise one or more of:
one or more entities associated with the user context;
a geographic location of the one or more entities associated with the user context;
a date associated with the user context; or
a time associated with the user context.

5. The method of claim 1, wherein the one or more recommended content objects associated with the first user context comprises one or more of:
a comment;
an audio clip;
an image;
a video;
a link;
a message; or
a review.

6. The method of claim 1, wherein each content suggestion is operable to allow the first user to select a corresponding recommended content object.

7. The method of claim 6, further comprising:
receiving, from the client system, a selection by the first user of a first content suggestion of the one or more content suggestions; and
generating a post based on the first content suggestion corresponding to a first recommended content object.

8. The method of claim 7, further comprising:
monitoring one or more social signals associated with the post; and
updating a user profile associated with the first user based on the social signals associated with the post.

9. The method of claim 1, further comprising generating a context index storing a plurality of contexts by:
accessing a plurality of content objects, wherein each content object comprises one or more social signals;
identifying one or more content objects based on their respective social signals, wherein each content object comprises content metadata;
determining, for each identified content object, one or more user contexts associated with the content object based on its content metadata;
aggregating the identified content objects into one or more aggregated sets based on the user contexts associated with the content objects, wherein each aggregated set corresponds to one or more user contexts, and wherein the content objects in a particular aggregated set have a similarity measure with respect to each other greater than a threshold similarity measure;
selecting one or more of the aggregated sets based on a number of content objects within the respective aggregated set;
generating, for each user context associated with one of the selected aggregated sets, a set of parameters indicative of the user context based on the content metadata of the content objects in the respect aggregated set; and
storing each set of parameters for each user context as a record in the context index.

10. The method of claim 9, generating the context index storing the plurality of contexts further comprises:
analyzing, for each user context, the content objects of the aggregated set associated with the user context to extract content representative of the user context; and
generating, for each user context, a set of recommended content objects associated with the user context, wherein the set of recommended content objects are stored with the record for the user context in the context index.

11. The method of claim 9, further comprising:
filtering one or more recommended content objects associated with a negative user sentiment.

12. The method of claim 1, wherein calculating the recommendation score comprises calculating, for each recommended content object, a global-recommendation score and a personalized-recommendation score for the recommended content object.

13. The method of claim 12, wherein the personalized-recommendation score for each recommended content object is calculated based on a comparison of content metadata of the recommended content object to content metadata of one or more content objects associated with the first user, wherein a first weight is assigned to the personalized-recommendation score in calculating the recommendation score.

14. The method of claim 12, wherein the global-recommendation score for each recommended content object is calculated based on a comparison of content metadata of the recommended content object to content metadata of one or more content objects associated with a popular global user context, wherein a first weight is assigned to the global-recommendation score in calculating the recommendation score.

15. The method of claim 1, wherein the one or more content suggestions to the first user comprise one or more suggestions to perform an action responsive to the trigger action.

16. The method of claim 15, wherein the suggested action comprises:
capturing an image;
recording a video; or
interacting with a content object.

17. One or more computer-readable non-transitory storage media embodying software that is operable when executed to:
receive, from a client system associated with a first user of an online social network, an indication of a trigger action by the first user, wherein the trigger action is associated with a user activity;
determine, by the one or more computing systems, a first user context based on the trigger action;
access, by the one or more computing systems, one or more recommended content objects associated with the first user context;
calculate, by the one or more computing systems, a recommendation score for each recommended content object;
generate, by the one or more computing systems, one or more content suggestions comprising one of the one or more recommended content objects, respectively, for the first user to share on the online social network, wherein each content suggestion corresponds to a recommended content object having a recommendation score above a threshold recommendation score; and
send, to the client system in response to the trigger action, instructions for presenting one or more of the content suggestions for the first user to share on the online social network, wherein each content suggestion comprises an activatable element selectable by the first user to share the corresponding recommended content object on the online social network.

18. A system comprising: one or more processors; and a non-transitory memory coupled to the processors comprising instructions executable by the processors, the processors operable when executing the instructions to:

- receive, from a client system associated with a first user of an online social network, an indication of a trigger action by the first user, wherein the trigger action is associated with a user activity;
- determine, by the one or more computing systems, a first user context based on the trigger action;
- access, by the one or more computing systems, one or more recommended content objects associated with the first user context;
- calculate, by the one or more computing systems, a recommendation score for each recommended content object;
- generate, by the one or more computing systems, one or more content suggestions comprising one of the one or more recommended content objects, respectively, for the first user to share on the online social network, wherein each content suggestion corresponds to a recommended content object having a recommendation score above a threshold recommendation score; and
- send, to the client system in response to the trigger action, instructions for presenting one or more of the content suggestions for the first user to share on the online social network, wherein each content suggestion comprises an activatable element selectable by the first user to share the corresponding recommended content object on the online social network.

* * * * *